(12) United States Patent
Setton

(10) Patent No.: US 9,117,229 B2
(45) Date of Patent: Aug. 25, 2015

(54) GENERATING REVENUE BY GROWING SALES OF THIRD-PARTY APPLICATIONS

(71) Applicant: TangoMe, Inc., Mountain View, CA (US)

(72) Inventor: Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 0 days.

(21) Appl. No.: 14/291,389

(22) Filed: May 30, 2014

(65) Prior Publication Data

US 2014/0358700 A1    Dec. 4, 2014

Related U.S. Application Data

(60) Provisional application No. 61/830,576, filed on Jun. 3, 2013.

(51) Int. Cl.
| | |
|---|---|
| *G06Q 30/02* | (2012.01) |
| *H04N 7/14* | (2006.01) |
| *H04L 12/58* | (2006.01) |
| *H04L 29/06* | (2006.01) |

(52) U.S. Cl.
CPC ........ *G06Q 30/0277* (2013.01); *G06Q 30/0273* (2013.01); *G06Q 30/0276* (2013.01); *H04L 51/04* (2013.01); *H04L 51/046* (2013.01); *H04L 63/08* (2013.01); *H04N 7/141* (2013.01); *H05K 999/00* (2013.01)

(58) Field of Classification Search
CPC ............................ H04N 7/141; G06Q 30/0277
USPC .......... 705/14.73, 14.49, 14.23; 709/225, 226
See application file for complete search history.

(56) References Cited

U.S. PATENT DOCUMENTS

| | | | |
|---|---|---|---|
| 7,240,214 B2 | 7/2007 | Gazzetta et al. | |
| 7,673,135 B2 | 3/2010 | Chin et al. | |
| 8,132,242 B1* | 3/2012 | Wu | 726/8 |
| 8,295,465 B2 | 10/2012 | Altberg et al. | |
| 8,560,841 B2 | 10/2013 | Chin et al. | |
| 8,839,395 B2 | 9/2014 | Poliashenko et al. | |
| 2004/0083297 A1* | 4/2004 | Gazzetta et al. | 709/229 |
| 2008/0052203 A1* | 2/2008 | Beyer et al. | 705/28 |
| 2009/0080635 A1 | 3/2009 | Altberg et al. | |

(Continued)

OTHER PUBLICATIONS

"Third-Party Apps on Facebook: Privacy and the Illusion of Control"—Wang et al, Penn State Univ., Aug. 2010 http://personal.psu.edu/nzw109/papers/Wang_chimit_2011.pdf.*

*Primary Examiner* — Randy Scott

(57) ABSTRACT

A method for generating revenue by growing sales of third-party applications, including: receiving, at a server communicatively coupled with a second application and from the second application located at a first device, an indication of a first application launching request, wherein the server includes a set of messaging functionalities that are available for implementation by the second application and are available for implementation by the first application upon delivery of an authentication token from the first application to the server; based on the receiving the indication of the first application launching request, generating an authentication token, wherein the authentication token is configured for providing an authentication pass to the server when delivered thereto by the first application, thereby allowing the first application access to the set of messaging functionalities; and sending the authentication token to the second application for delivery to the first application.

7 Claims, 14 Drawing Sheets

(56) References Cited

U.S. PATENT DOCUMENTS

| | | |
|---|---|---|
| 2010/0199341 A1 | 8/2010 | Foti et al. |
| 2012/0291114 A1* | 11/2012 | Poliashenko et al. ............. 726/8 |
| 2014/0358700 A1 | 12/2014 | Setton |

\* cited by examiner

1200

RECEIVES, AT A SERVER COMMUNICATIVELY COUPLED WITH A SECOND APPLICATION AND FROM THE SECOND APPLICATION LOCATED AT A FIRST DEVICE, AN INDICATION OF A FIRST APPLICATION LAUNCHING REQUEST, WHEREIN THE SERVER INCLUDES A SET OF MESSAGING FUNCTIONALITIES THAT ARE AVAILABLE FOR IMPLEMENTATION BY THE SECOND APPLICATION AND ARE AVAILABLE FOR IMPLEMENTATION BY THE FIRST APPLICATION UPON DELIVERY OF AN AUTHENTICATION TOKEN FROM THE FIRST APPLICATION TO THE SERVER
1205

BASED ON THE RECEIVING THE INDICATION OF THE FIRST APPLICATION LAUNCHING REQUEST, GENERATES THE AUTHENTICATION TOKEN, WHEREIN THE AUTHENTICATION TOKEN IS CONFIGURED FOR PROVIDING AN AUTHENTICATION PASS TO THE SERVER WHEN DELIVERED THERETO BY THE FIRST APPLICATION, THEREBY ALLOWING THE FIRST APPLICATION ACCESS TO THE SET OF MESSAGING FUNCTIONALITIES
1210

SENDS THE AUTHENTICATION TOKEN TO THE SECOND APPLICATION FOR DELIVERY TO THE FIRST APPLICATION
1215

RECEIVES THE AUTHENTICATION TOKEN FROM THE FIRST APPLICATION AND AFTER THE RECEIVING OF THE AUTHENTICATION TOKEN, PROVIDES ACCESS TO THE SET OF MESSAGING FUNCTIONALITIES FOR IMPLEMENTATION BY THE FIRST APPLICATION, WHEREIN THE SET OF MESSAGING FUNCTIONALITIES ARE ACCESSED OVER A COMMUNICATION PLATFORM OF THE FIRST APPLICATION, WHEREIN THE COMMUNICATION PLATFORM INCLUDES COMMUNICATION FUNCTIONALITIES CONFIGURED FOR ENABLING COMMUNICATION WITH A SECOND DEVICE, WHEREIN THE FIRST DEVICE AND THE SECOND DEVICE ARE DIFFERENT
1220

RECEIVES AN AUTHENTICATION TOKEN FROM A FIRST APPLICATION LOCATED AT A FIRST DEVICE AND AT A SERVER COMMUNICATIVELY COUPLED WITH THE FIRST APPLICATION, WHEREIN THE AUTHENTICATION TOKEN IS CONFIGURED FOR PROVIDING AN AUTHENTICATION PASS TO THE SERVER WHEN DELIVERED THERETO BY THE FIRST APPLICATION, THEREBY ALLOWING THE FIRST APPLICATION ACCESS TO A SET OF MESSAGING FUNCTIONALITIES LOCATED AT THE SERVER AND CAPABLE OF BEING IMPLEMENTED ON THE FIRST APPLICATION
1235

AFTER THE RECEIVING THE AUTHENTICATION TOKEN FROM THE FIRST APPLICATION, PROVIDES A CONNECTION BETWEEN THE SERVER AND THE FIRST APPLICATION, WHEREIN THE CONNECTION ENABLES THE SET OF MESSAGING FUNCTIONALITIES THAT RESIDE AT THE SERVER AND THAT ARE AVAILABLE FOR IMPLEMENTATION BY THE SECOND APPLICATION TO BE AVAILABLE FOR IMPLEMENTATION BY THE FIRST APPLICATION, WHEREIN THE SET OF MESSAGING FUNCTIONALITIES ARE COMMUNICATED OVER A COMMUNICATION PLATFORM OF THE FIRST APPLICATION, WHEREIN THE COMMUNICATION PLATFORM INCLUDES COMMUNICATION FUNCTIONALITIES CONFIGURED FOR ENABLING COMMUNICATION WITH A SECOND DEVICE, WHEREIN THE FIRST DEVICE AND THE SECOND DEVICE ARE DIFFERENT
1240

RECEIVES, FROM THE SECOND APPLICATION LOCATED AT THE FIRST DEVICE AND AT THE SERVER COMMUNICATIVELY COUPLED WITH THE SECOND APPLICATION, AN INDICATION OF A FIRST APPLICATION LAUNCHING REQUEST, BASED ON THE INDICATION OF THE FIRST APPLICATION LAUNCHING REQUEST, GENERATES AN AUTHENTICATION TOKEN, AND SENDS THE AUTHENTICATION TOKEN TO THE SECOND APPLICATION FOR DELIVERY TO THE FIRST APPLICATION
1245

PROVIDES ACCESS TO THE SET OF MESSAGING FUNCTIONALITIES FOR IMPLEMENTATION BY THE FIRST APPLICATION
1250

FIG. 12B

GENERATING REVENUE BY GROWING SALES OF THIRD-PARTY APPLICATIONS

CROSS-REFERENCE TO RELATED APPLICATIONS

This application claims priority to and benefit of U.S. Patent Application No. 61/830,576 filed on Jun. 3, 2013 entitled "GENERATING REVENUE BY GROWING SALES OF THIRD-PARTY APPLICATIONS", by Eric Setton, and assigned to the assignee of the present application.

This application is related to co-pending U.S. patent application Ser. No. 14/291,332 filed on May 30, 2014 entitled "AUTHENTICATING A THIRD-PARTY APPLICATION FOR ENABLING ACCESS TO MESSAGING FUNCTIONALITIES", by Eric Setton, assigned to the assignee of the present application, and incorporated herein in its entirety.

This application is related to co-pending U.S. patent application Ser. No. 14/291,361 filed on May 30, 2014 entitled "COMMUNICATION FACILITATOR", by Eric Setton, assigned to the assignee of the present application, and incorporated herein in its entirety.

BACKGROUND

Conventionally, two or more devices (e.g., mobile devices, tablets) may have the same communication enabling application installed thereon which enables teleconferencing communication between these devices. The devices may also have stored thereon a third-party application, such as an application for playing poker singularly or with individuals across several devices. The users of these devices may play poker against the computer or with each other, while also participating in a teleconference call, using the teleconferencing functions as enabled by the communication enabling application. However, the users of these devices would not be able to use the teleconferencing functions (provided by the communication enabling application) while playing the poker game with each other unless the users are communicatively connected via the communication enabling application. Thus, the functional features of the communication enabling application are only realized while the communication enabling application is running.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 12A is a flow diagram of a method for generating revenue by growing sales of third-party applications, in accordance with an embodiment.

FIG. 12B is a flow diagram of a method for generating revenue by growing sales of third-party applications, in accordance with an embodiment.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "receiving", "validating", "sending", "delivering", "monitoring", "connecting", "communicating", "accessing", "retrieving", "generating", "determining", "sharing", "providing", "enabling", or the like, often refer to the actions and processes of an electronic computing device (or portion thereof), module or system, such as, but not limited to, an authentication intermediary, a communication facilitator and a messaging functionality distributor (See FIGS. 5, 6, 8, 9 and 11). The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Figure 1:
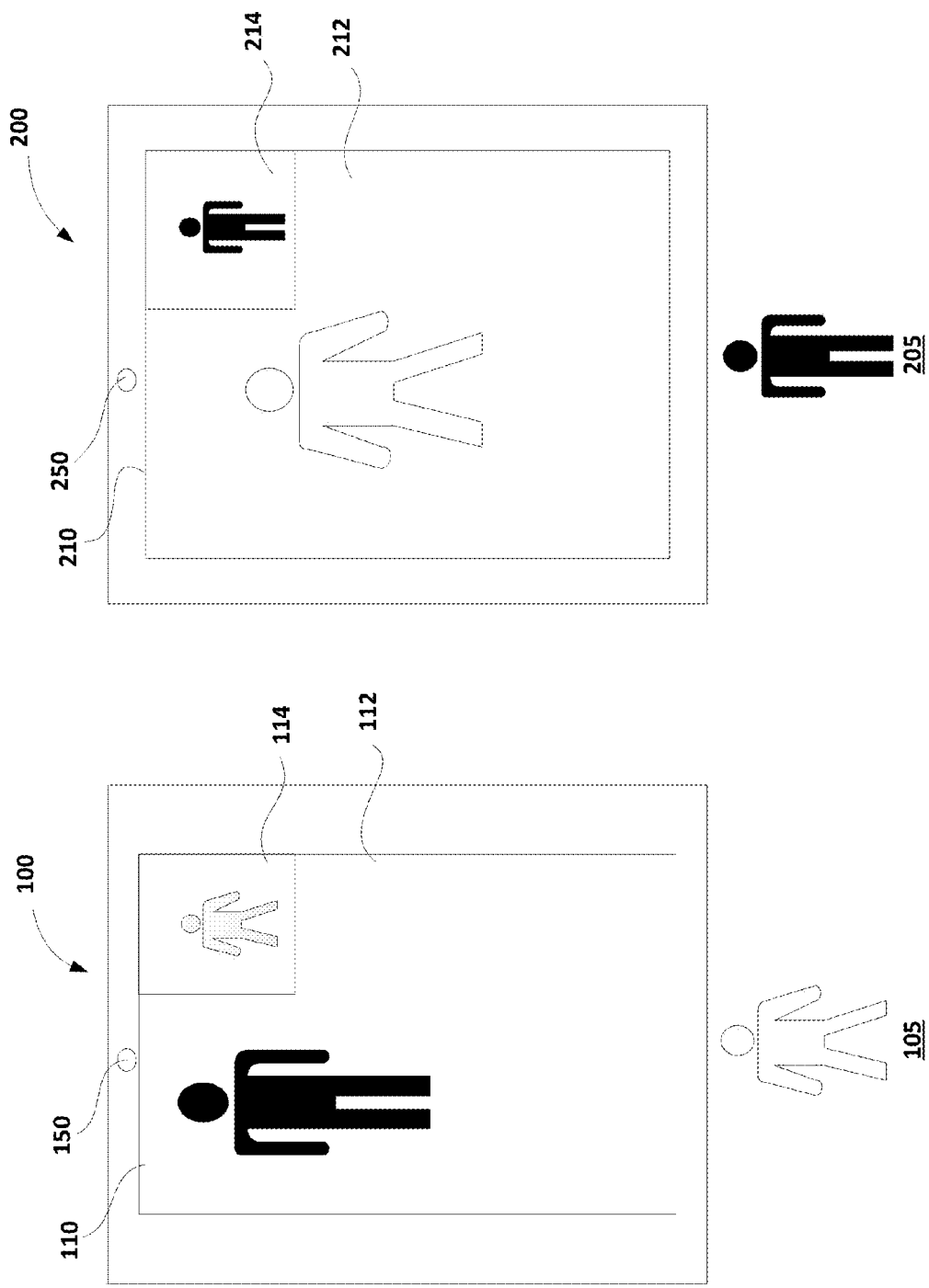
FIG. 1 is a block diagram that illustrates example devices upon which embodiments for the following operate, in accordance with an embodiment: authenticating a third-party application for enabling access to messaging functionalities; enabling engagement between a first application on a device and a set of contacts associated with a second application on the device; and generating revenue by growing sales of third-party applications.
Figure 2:
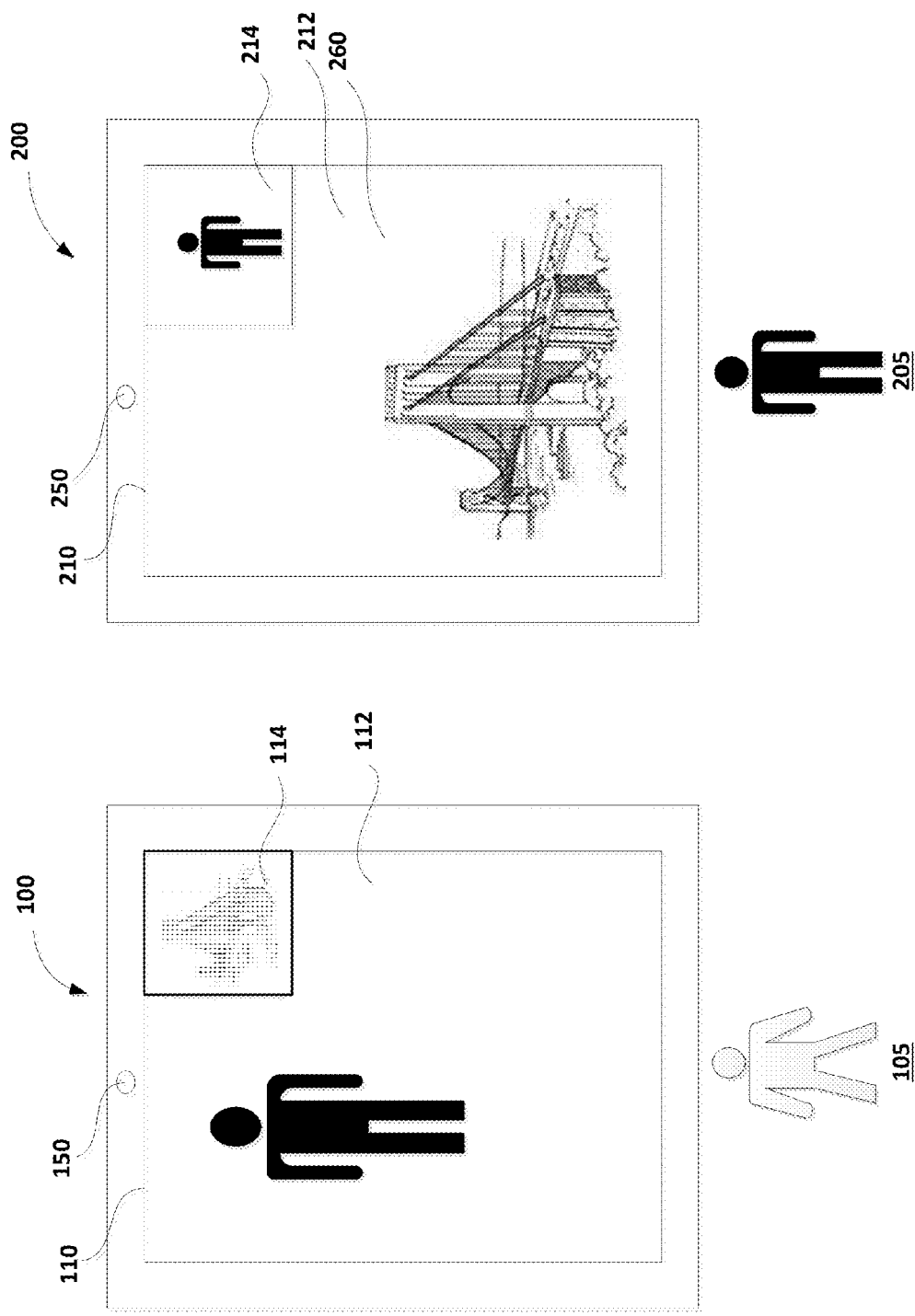
FIG. 2 is a block diagram that illustrates example devices upon which embodiments for the following operate, in accordance with an embodiment: authenticating a third-party application for enabling access to messaging functionalities; enabling engagement between a first application on a device and a set of contacts associated with a second application on the device; and generating revenue by growing sales of third-party applications.
Figure 3:
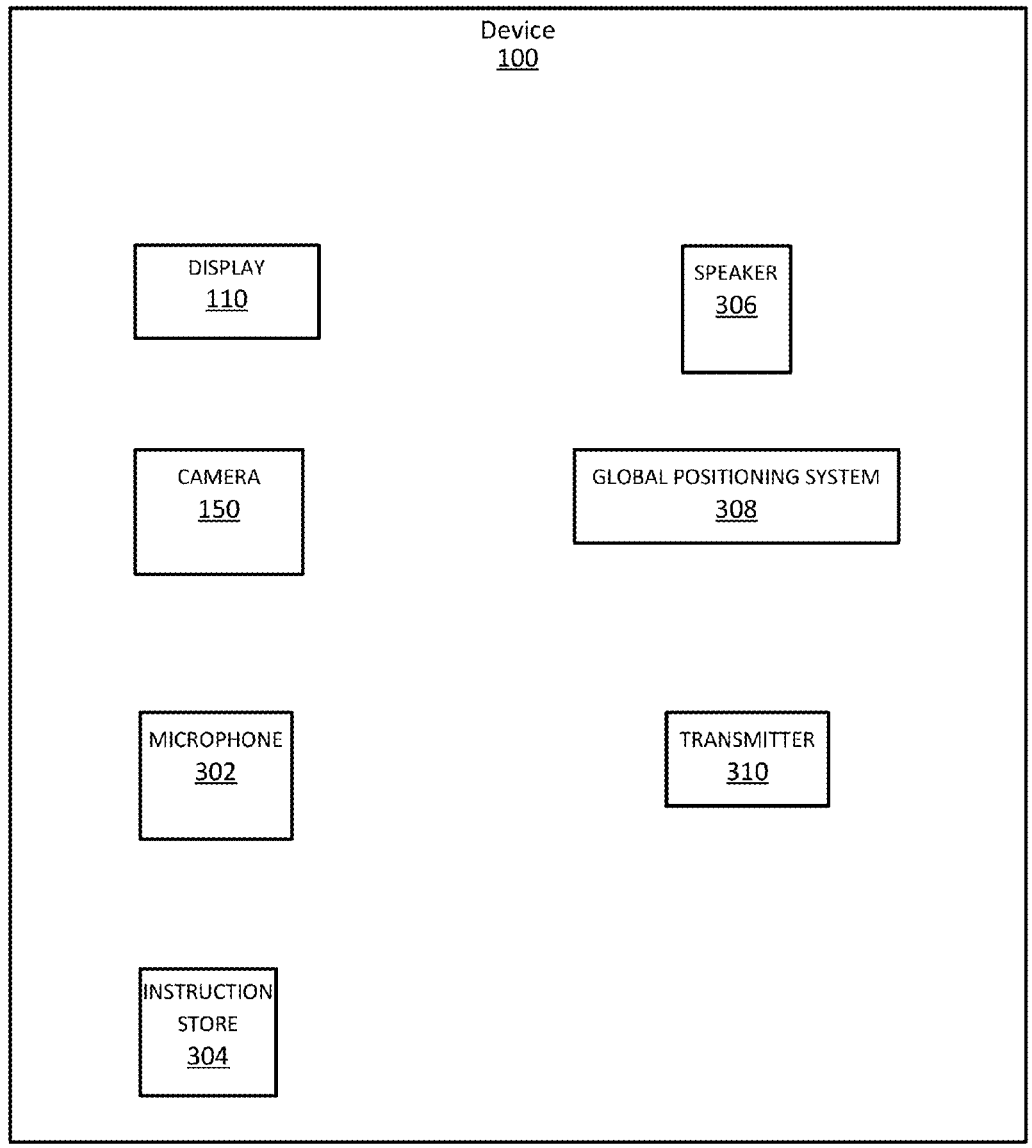
FIG. 3 is a block diagram of an example device (e.g., mobile device) upon which embodiments for the following operate, in accordance with an embodiment: authenticating a third-party application for enabling access to messaging functionalities; enabling engagement between a first application on a device and a set of contacts associated with a second application on the device; and generating revenue by growing sales of third-party applications.

FIGS. 1-3, as well as the brief introductory description below, discuss the operation of two mobile devices communicating with each other using a communication enabling application, such as Tango™. The discussion turns to a general description of embodiments performing a handshake between a third-party application and a communication enabling application. (See FIG. 4.) The discussion continues with a general overview of embodiments.

The discussion continues with a description of an example authentication intermediary of a communication enabling application and a method for authenticating a third-party application for enabling access to messaging functionalities, in accordance with embodiments. (See FIGS. 5-7.) The discussion then turns to a description of an example communication facilitator coupled with a third-party application and a method for enabling engagement between a first application on a device and a set of contacts associated with a second application on the device. (See FIGS. 8-10.) The discussion continues with a description of an example messaging functionality distributor and a method for generating revenue by growing sales of third-party applications. (See FIGS. 11-12B.) Finally, the discussion concludes with a description of an example computer system upon which the example authentication intermediary, the example platform communicator and the example messaging functionality distributor and the example methods described herein operate. (See FIG. 13.)

Devices Communicating via a Communication Enabling Application

FIGS. 1 and 2 depict the devices 100 and 200 participating in a video conference. In general, video conferencing allows two or more locations to interact via multi-way video and audio transmissions simultaneously. In various embodiments, the devices 100 and 200 have installed thereon a communication enabling application, such as Tango™. A communication enabling application is an application able to be installed on devices that provide messaging functions. These messaging functions allow device users to connect with other users over a communication network, via text, video, voice calls, shared photos, games, music sharing, etc.

For clarity and brevity, the discussion will focus on the components and functionality of the device 100. However, the device 200 operates in a similar fashion as the device 100. In one embodiment, the device 200 is the same as the device 100 and includes the same components as the device 100.

Of note, in one embodiment, the mobile device of FIG. 1 includes the components that are described as belonging to the device 100 in FIG. 1. The functionality of the device 100 during a video conference between the devices 100 and 200 is described below with reference to FIGS. 1 and 2.

The devices 100 and 200 are any communication devices (e.g., laptop, desktop, smartphones, tablets, TV, etc.) capable of participating in a video conference. In various embodiments, the device 100 is a hand-held mobile device, such as smart phone, personal digital assistant (PDA), and the like.

FIG. 3 is a block diagram of the device 100, in accordance with embodiments. According to embodiments, the device 100 includes a display 110, a camera 150, and a transmitter 310 for transmitting and receiving communications. The device 100, in various embodiments, includes any of the following components: a microphone 302; an instruction store 304; a speaker 306; and a global positioning system 308. In various embodiments, the device 100 is variously coupled with any of the following, as will be described herein: a server; and a third-party application. The server provides services to the communication enabling application installed on the device 100. In one embodiment, the third-party application is installed at the device 100. In another embodiment, the third-party application is located external to the device 100, though communicatively (via wire and/or wirelessly) coupled thereto.

The display 110 is configured for displaying video captured at the device 100. In another embodiment, the display 110 is further configured for displaying video captured at the device 200.

The camera 150 captures video at the device 100. The transmitter 310 is for transmitting data (e.g., control code).

The microphone 302 captures audio at the device 100. The speaker 306 generates an audible signal at the device 100.

In one embodiment, the instruction store 304 stores information associated with the third-party applications (as described below). The global positioning system 308 determines a location of a device 100. In another embodiment, the server (shown in FIG. 4) (in addition to or alternatively to the instruction store 304) stores information associated with the third-party applications (as described below).

Referring now to FIGS. 1 and 2, the devices 100 and 200 are participating in a video conference with one another, in accordance with an embodiment. In various embodiments, more than two devices participate in a video conference with each another.

During the video conference, the camera 250 captures video at the device 200. For example, the camera 250 captures video of the user 205 of the device 200.

The camera 150 captures video at device 100. For example, the camera 150 captures video of the user 105. It should be appreciated that the video cameras 150 and 250 can capture any objects that are within the respective viewing ranges of the cameras 150 and 250. (See the discussion below with reference to FIG. 2.)

A microphone 302 captures audio signals corresponding to the captured video signal at the device 100. Similarly, a microphone of the device 200 captures audio signals corresponding to the captured video signal at the device 200.

In one embodiment, the video captured at device 200 is transmitted to and displayed on the display 110 of the device 100. For example, a video of the user 205 is displayed on a first view 112 of the display 110. Moreover, the video of the user 205 is displayed on a second view 214 of display 210.

The video captured at device 100 is transmitted to and displayed on the display 210 of the device 200. For example, a video of the user 105 is displayed on the first view 212 of the display 210. Moreover, the video of the user 105 is displayed on a second view 114 of the display 110.

In one embodiment, the audio signals captured at the devices 100 and 200 are incorporated into the captured video. In another embodiment, the audio signals are transmitted separate from the transmitted video.

As depicted, the first view 112 is the primary view displayed on the display 110 and the second view 114 is the smaller secondary view displayed on the display 110. In various embodiments, the size of both the first view 112 and the second view 114 are adjustable. For example, the second view 114 can be enlarged to be the primary view and the first view 112 can be diminished in size to be the secondary view (the second view 114). Moreover, either one of views, the first view 112 or the second view 114 can be closed or fully diminished such that it is not viewable.

With reference now to FIG. 2, the user 205 of the device 200 is capturing the image of a bridge 260 (instead of capturing an image of himself/herself 205), which is within the viewing range of the camera 250. The image of the bridge 260 is depicted at the second view 114 of the device 100, and at a first view 212 of the device 200. Additionally, while not shown in FIGS. 1 and 2, depending on the setup parameters of the devices 100 and 200, the image of the bridge 260 may be displayed in the second view 214 on the display screen 210 and in the first view 112 of the display screen 110, while the image of the user 105 is displayed in the first view 212 on the display screen 210 and the image of the user 205 is displayed in the first view 112 on the display screen 110. As noted, the images of the objects captured with the video cameras may or may not be displayed in various views on the display screens of the devices 100 and 200.

Figure 13:
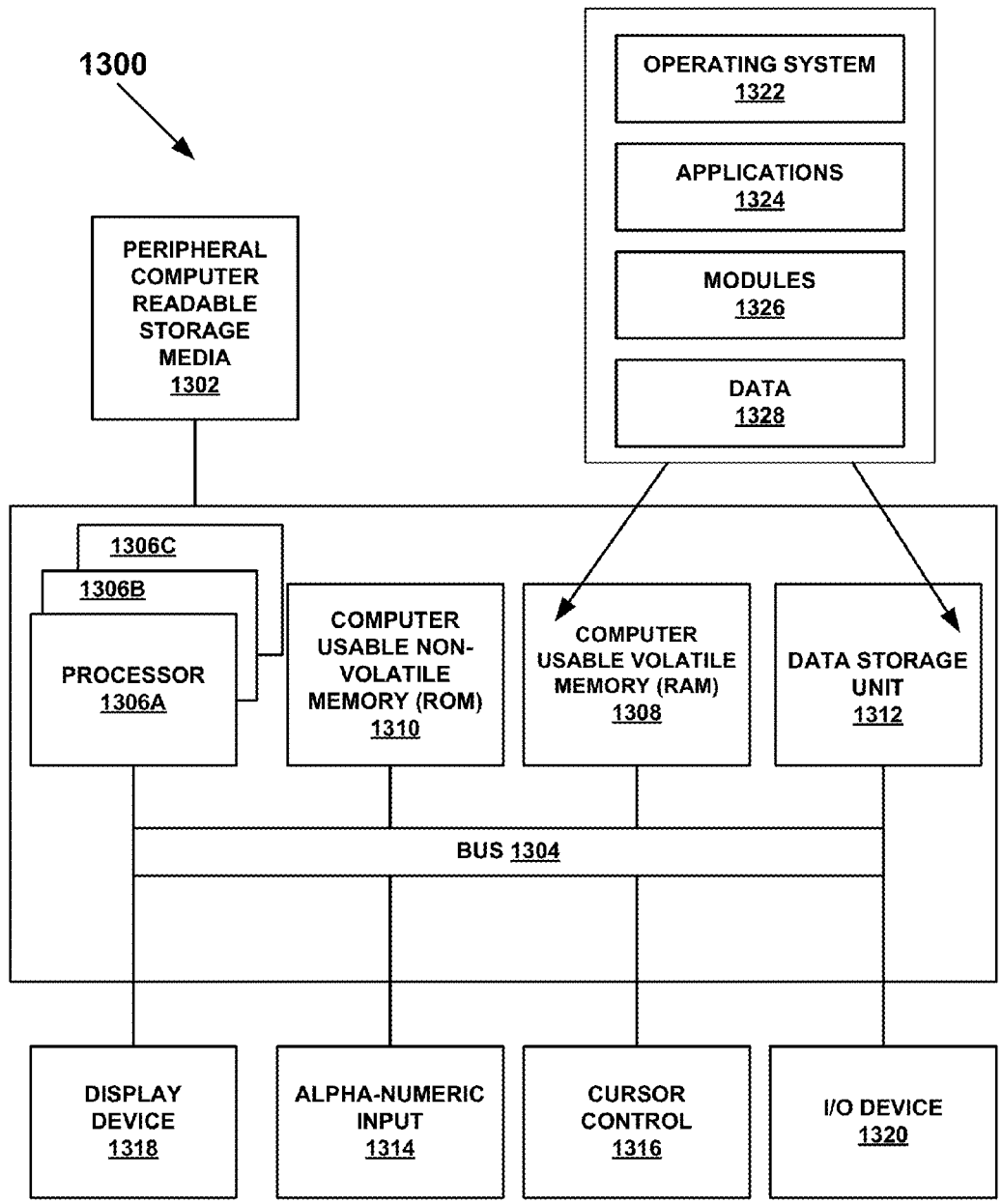
FIG. 13 is a block diagram of an example computer system with which or upon which various embodiments of the present invention may be implemented.

Of note, the components of the device 100 shown in FIG. 3 are used with and each component's functions enabled by a computer system that is coupled to the components and resides at the device 100, such as the computer system 1300 described in FIG. 13.

General Description of Embodiments in Cooperation with a Communication Enabling Application Conventionally, two or more devices (e.g., mobile devices, tablets) may have the same communication enabling application installed thereon which enables teleconferencing communication between these devices. The devices may also have stored thereon a third-party application, such as an application for playing poker singularly or with individuals across several devices. The users of these devices may play poker against the computer or with each other, while also participating in a teleconference call, using the teleconferencing functions as enabled by the communication enabling application. However, the users of these devices would not be able to use the teleconferencing functions (provided by the communication enabling application) while playing the poker game with each other unless the users are communicatively connected via the communication enabling application. Thus, the functional features of the communication enabling application are only realized while the communication enabling application is running.

Additionally, in conventional technology, the communication enabling application provides a service and may have a large user-base. The users of the user-base are all provided with the same content that can be accessed inside of the communication enabling application. For example, users can play games together while on a teleconference call (using the communication enabling application) and even purchase other applications while using the communication enabling application. However, in conventional technology, there is a limited amount of content that can be bundled with the communication enabling applications. Thus, communication enabling applications are limited in the quantity of features/functions they are able to provide to device users.

Embodiments enable an expansion of the services offered by communication enabling applications (text messages, video and voice calls, photo sharing, music sharing), and enable the functionalities provided by the communication enabling applications to be utilized by third-party applications. Third-party applications are programs written to work within operating systems, but are written by individuals or companies other than the provider of the operating system. Thus, in the context of this application, the communication enabling application referred to herein and the third-party application are different. The communication enabling application is authored by a first party and the third-party application is authored by a second party, wherein the first party and the second party are different. Further, according to embodiments, a server supports the functions of the communication enabling application, as well as expanding upon functions provided to the user by the communication enabling application.

Embodiments enable a third-party application (e.g., gaming application) to be launched on a device (e.g., mobile device, tablet, personal computer), wherein the user of the device may interact with the third-party application and a user of a separate mobile device using the same messaging functionalities provided by a server (wherein the server, as discussed, supports the functions/services provided by a communication enabling application that is already installed on the device). In accordance with embodiments, the server, the communication enabling application and the third-party application must exchange authentication tokens that validate the third-party application's identity for purposes of receiving messaging functionalities provided by the server, prior to the device user being able to use these messaging functionalities while interacting with third-party applications.

According to an embodiment, once a user is enabled to use the messaging functionalities provided by the server while interacting with the third-party application, then the device user may use the set of contacts listed within the communication enabling application to send promotional material to promising contacts (e.g., those contacts likely to want to purchase the third-party application) of the set of contacts. This promotional material may include offers to the contacts to purchase the third-party application for installation on their devices. Further, the owner of the communication enabling application may receive compensation for promotional material being generated, delivered and/or the third-party application being purchased. The term "owner" is meant to refer to any entity (which may be a business[es] or a person[s]) entitled to receive compensation, as described herein, under the law. Thus, embodiments increase sales of third-party applications. Further embodiments increase revenue for the owner of the communication enabling application.

Pivotal to the operation of embodiments is the authentication of the third-party application with the server, wherein the server provides the messaging functionalities to the communication enabling application. Upon authentication of the third-party application, the server will also provide these messaging functionalities for use by the third-party application and/or the user of the third-party application. Authentication of the third-party application refers to validating that the user of the device upon which the third-party application is being launched is who he/she says that he/she is. That is, it is verified that the third-party application is being launched on a device which also has installed thereon the communication enabling application. The server will only provide the messaging functionalities to be used by a third-party application and/or the user of the third-party application if that third-party application is launched from a device that also has installed thereon the communication enabling application.

During the authentication process, a handshake occurs between the communication enabling application and the third-party application, wherein the handshake includes the exchange of authentication tokens. Ultimately, authentication tokens are exchanged between the server, the communication enabling application and the third-party application, thereby acknowledging the identity of the third-party application and validating the third-party application as being on the same device as the communication enabling application. Upon this acknowledgement and validation, via the exchange of authentication tokens, the third-party application is enabled to use the same messaging functionalities as are provided to the device user by the communication enabling application. Thus, the authentication tokens are exchanged in the handshake between the communication enabling application and the third-party application.

Figure 4:
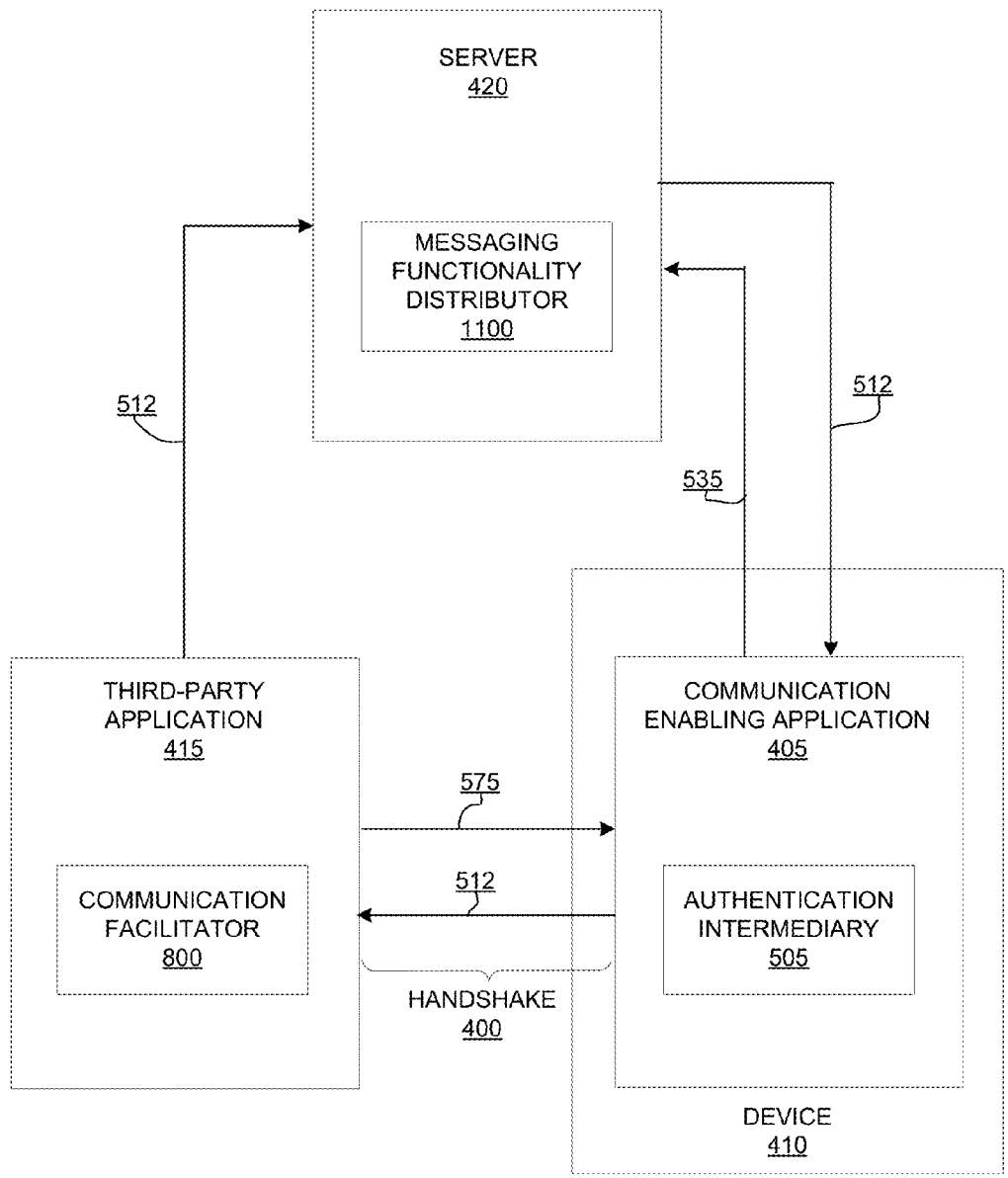
FIG. 4 is a block diagram depicting a general description of embodiments in cooperation with a communication enabling application.

FIG. 4 illustrates a handshake between a communication enabling application 405 (e.g., Tango™) that is already installed on a device 410 and a third-party application 415 that is desired to be launched on the device 410, in accordance with an embodiment. Of note, the device 410, in one embodiment, is the mobile device 100 or 200 of FIGS. 1 and 2. However, it should be appreciated that the device 410 may be any device capable of having installed thereon a communication enabling application that allows users to communicate (e.g., via teleconferencing) with other devices having installed thereon the same communication enabling application. The handshake 400 entails the exchange of an authentication token 425, identifying the third-party application 415 to the server 420 (that supports the communication enabling application's 415 functionalities).

A general, high-level example of an implementation of an embodiment follows. A user of the mobile device 410 (and therefore a user of the communication enabling application 405) wishes to launch a third-party application 415 on his mobile device 410. In one example scenario and in accordance with an embodiment, the user of the mobile device 410 taps on the "connect" button shown as an icon appearing on the display screen of the mobile device 410 (display screen not shown in FIG. 4). The icon represents the third-party application 415.

Upon initiating a connection with the third-party application 415 for purposes of launching the third-party application 415, the communication enabling application 405 communicates with the server 420 that is designed to perform services (e.g., messaging functionalities) for the communication enabling application 405 (and designed to perform services for third-party applications once authenticated). The communication enabling application 405 requests an authentication token from the server 420. The server 420 sends an authentication token 425 to the communication enabling application 405. The communication enabling application 405 delivers the authentication token 425 to the third-party application 415. The third-party application 415 sends this authentication token 425 to the server 420. Upon receiving the authentication token 425, the server 420 accepts a connection with the third-party application 415. Upon accepting a connection with the third-party application 415, the server 420 provides to the user of the third-party application 415, for use with the third-party application 415, the same functionalities (video conferencing, messaging, various viewing windows, etc.) provided by the communication enabling application 405 to the user of the mobile device 100. These messaging functionalities are used in cooperation with the functionalities of the third-party application 415 (e.g., gaming application). Significantly, in embodiments, it is not necessary for the user to be using (e.g., signed into) the communication enabling application 405 in order to enjoy the same functionalities provided by the communication enabling application 405. Further, in one embodiment, the handshaking occurs without any typing or input from the user of the device 410. Thus, in one embodiment, a contact of a set of contacts (that are associated with the communication enabling application 405) of the user of the mobile device 410 is invited to purchase and/or play the third-party application without the user ever having to input, or even select, the contact's name. In another embodiment, the user of the mobile device 410 may select one or more contacts from the set of contacts (associated with the communication enabling application 405) to which to send promotional material regarding purchasing and/or playing the third-party application.

A more detailed description of the system for generating revenue by growing sales of third-party applications is found below, including: 1) an authentication intermediary; 2) a communication facilitator; and 3) a messaging functionality distributor.

Referring still to FIG. 4, the authentication intermediary 505 (See FIGS. 5 and 6) is located at the communication enabling application 405. The communication facilitator 800 (See FIGS. 8 and 9) is located at the third-party application 415. The messaging functionality distributor 1100 (See FIG. 11) is located at the server 420. (The server 420 supports the messaging functionalities that are provided through the communication enabling application 405.) The authentication intermediary 505, the communication facilitator 800 and the messaging functionalities distributor 1100 work together to validate a third-party application's ability to receive the messaging functionalities from the server 420, provide promotional material to a list of contacts garnered from the communication enabling application 405 to increase sales of a third-party application 415 and provide compensation to the owner of the communication enabling application 405 for the sending of the promotional material and/or the purchase of the third-party application 415. Further, the communication enabling application 405 and the third-party application 415 have installed thereon the necessary APIs to communicate with each other.

Embodiments enable various implementations, some of which are described immediately below. A high-level example of an implementation of an embodiment is as follows. A child, "Paul", picks up his mobile phone and sees that he has just received an invite, through his communication enabling application (e.g., Tango™) and from his father, to purchase and play a "Deer Hunting" gaming application. Paul taps with his finger onto the message image of the Deer Hunting application that appears on his mobile phone display screen and is directed to the URL at which Paul can purchase the Deer Hunting application (at an application store). Paul then purchases the Deer Hunting application. Now, Paul and his father can play the Deer Hunting game, either individually, or together. In one embodiment, every time Paul, his father, or both of them log into the Deer Hunting application, each is presented with each other's score. This presentation of scores occurs through the server 420 to the third-party application 415. The messaging functionalities that are available to the communication enabling application 405 are also available for user with the third-party application. Thus, Paul and his father can send messages back and forth to each other. For example, Paul can tell his father, "Hey, I just beat your high score". This taunt may entice Paul's father to log into the application to play the game, become better, and keep up with his son's gaming talents.

Further, with reference to FIG. 4 and continuing with the this Deer Hunting application example, when Paul's father initially launched the Deer Hunting third-party application on his device 410, a request for an authentication token was sent to the communication enabling application 405. The server 420 returned an authentication token 425 to the communication enabling application 405. The communication enabling application 415 sent this authentication token 425 to the third-party application 415. The third-party application 415 sent the authentication token 425 to the server 420. The server 420, upon receipt of the authentication token 425, enabled the messaging functionalities available for use in the communication enabling application 405 to be used, from the server 420, by the third-party application 415 and/or the user of the third-party application 415. In one embodiment, the handshake occurs without Paul's father actually being signed into and using the communication enabling application 405. In another embodiment, the handshake occurs while Paul's father is signed into the communication enabling application 405, and the application is running. Paul's father, having already verified that he is allowed to use the messaging functionalities provided by the server 420 to the third-party application 415, now causes a recommendation to purchase and play the Deer Hunting application to be sent to Paul's device. Paul's device also has installed thereon the communication enabling application 405. Further, it should be appreciated that once Paul "launches" the purchase and installation of the third-party application 415 on his device, Paul's device also performs handshake as described herein. Further, in one embodiment, the handshake occurs at Paul's device without Paul being signed into the communication enabling application on his device. In yet another embodiment, the handshake occurs at Paul's device while Paul is signed into the communication enabling application on his device and the communication enabling application is running.

In another embodiment, Paul exits the communication enabling application, and then goes to an application store via a website URL to purchase the third-party application. In yet another embodiment, the owner of the third-party application only sells the third-party application at a particular vendor's application store. In another embodiment, Paul automatically receives the Deer Hunting application, once Paul's father sends a message to Paul indicating that he wants to play the Deer Hunting gaming application with Paul or play the Deer Hunting gaming application in parallel with Paul playing the Deer Hunting gaming application.

In another high-level example of an implementation of an embodiment, a "War" application offers to players the opportunity to purchase accessories to the gaming application, such as, bigger guns, more tanks, greater powers, etc. Once a player, Sarah, purchases these accessories, other players of War, who also have installed on their device the same communication enabling application as Sarah has installed on her device, are notified via the third-party application, War, of Sarah's purchase. (Of note, it is not necessary for the communication enabling application to be running while messages are being sent between players of the War gaming application, using the messaging functionalities provided by the server 420.) Sarah's friend, Bill, sees the notification of Sarah's purchase of the power to become invisible. This prompts Bill to purchase his own accessories to the gaming application, War. In particular, Bill purchases the power to breath underwater as well as guns that spray purple ink on objects (in order to neutralize Sarah's ability to remain invisible in the gaming application). In one embodiment, the communication enabling application then receives money from the owner of the third-party application that represents 10% of the purchase price of the War gaming application. Thus, in one embodiment, for every dollar amount purchased in accessories by players, and/or players being determined to have been enticed to spend for such accessories through the promotional material presented from the War gaming application and/or through the communication enabling application itself, the owner of the communication enabling application receives a predetermined portion (e.g., percentage, set amount, etc.) of that dollar amount.

Thus, embodiments provide enhanced game playing, with enhanced sales and thus a revenue stream for the owner of the third-party application, as well as a revenue stream for the owner of the communication enabling application.

In one embodiment, during the handshaking process described above, the server 540 sends to the user of the mobile device 410 the user's list of contacts and allows the user to communicate with contacts on the list of contacts. In one embodiment, the contacts who are invited to play a gaming application are selectively and intelligently filtered from the contacts found in the communication enabling application. For example, in one communication enabling application installed on a device, a player of a third-party application that is also installed on the device has four hundred contacts listed in the communication enabling application. However, ninety percent of those contacts the player does not communicate with on a regular basis. Thus, in one embodiment, only those contacts that the player is actively engaged with are targeted for an invitation to purchase the third-party application. This regular interaction may be determined by, for example, the number of messages sent between the user of the device and the contact(s). In another embodiment, the user of the device having the communication enabling application installed thereon invites a particular person to purchase the third-party application, wherein that particular person has a particular ID already assigned in the address book of the communication enabling application. Any number of parameters may be created to determine which contacts are invited to purchase a third-party application. For example, the parameters may involve any, but not limited to, the following: the number of text messages between the user of the device and the contact(s); the number of calls between the user of the device and the contact(s); the number of minutes per call; the day of the week on which the call was made; the time of day that the call was made; how frequently a contact views a certain genre of third-party application games; the contact's age; the contact's country of residence; the language with the contact speaks; and how much and/or frequently a contact purchases offered product(s). For example, the higher the ratio of the purchasing performed by a contact of those products offered to the contact, the more likely that the third-party application is going to present itself to the contact for purchasing. Thus, in one embodiment, even though a contact is considered to be a frequent contact and given multiple opportunities to purchase various third-party applications, if the contact never purchases a third-party application, embodiments will not send invitations to that contact anymore.

When a contact receives an invitation via a message over the communication enabling application, embodiments provide the contact, upon the receipt of the indication that the third-party application is desired by the contact to be installed on the contact's device, with a URL (e.g., for an application store) at which the contact may access (via installing) and/or purchase the gaming application. In another embodiment, the URL may be used to directly launch the gaming application.

Thus, embodiments provide a graceful experience for the contact attempting to install or play the gaming application to which he/she has been invited to purchase and/or play.

In one embodiment, the popularity of the application is a consideration in determining if an invitation is sent to contact(s) associated with the communication enabling application. For example, a certain gaming application is known to be purchased by 80% of those to whom it is offered. Embodiments may invite a contact to purchase the popular gaming application, even though the contact normally only purchases about 14% of the gaming applications to which he/she is introduced. Conversely, if a gaming application is found to not be popular, then embodiments may not send an invitation for a contact to purchase the unpopular gaming application, even though the contact normally purchases offered gaming applications at a rate of 75%.

In one embodiment, the invitation to purchase the third-party applications is a message (using a messaging functionality), sent as any type of composite media (e.g., animations, text, picture, video), either in real-time or asynchronous, either one-to-one or in a group, and/or initiated from a player or from the third-party application to a portion of the contact list, etc. For example, the message could contain a link that, once clicked upon, would take the invited contact to the correct third-party application store. Additionally, or alternatively, the invited contact could be invited to a webpage, or some other accessible location at which the third-party application would be found. In one example of a real-time communication being initiated, Bob and Joe are playing a poker game (third-party application). The game of poker involves the reading of a person's behavior, such as, for example, looks, bluffs, speech, etc. Thus, embodiments provide, through the messaging functionalities provided from the server 540 and/or the communication enabling application, a voice channel and a video channel during the playing of the Poker gaming application, thereby enhancing the users' experiences. Other messaging functionalities include the ability to replay messages.

Conventionally, an email might be sent to a contact of a set of contacts to provide a product offering. According to embodiments, sending messages through the communication enabling application, such that the messages resemble those messages of a SMS, entices the user of the device who receives the messages to open the messages. The messages resembling an SMS has a higher likelihood of being opened up and is less expensive than sending an email or an SMS.

In one embodiment, a contact's social profile may be accessed by another user of the communication enabling application. This accessed content of the contact's social profile may encourage more access to particular third-party applications. For example, the social profile may give examples of the contact's likes and dislikes, thereby influencing others to investigate the nature of the contact's likes and dislikes, leading to increased sales revenues for applications.

In one embodiment, the communication enabling application includes therein one or more stores at which game accessories may also be purchases.

Embodiments also enable the concept of cross-promotion of products. For example, in one embodiment, a user of a communication enabling application may target a particular user of a first third-party application to invite that particular user to use a second third-party application that he/she may also like. For example, a user of a duck hunter third-party application might be invited to purchase and/or try a deer hunter third-party application. In one embodiment, the owner of the deer hunter third-party application pays the owner of the communication enabling application to send an invitation to a contact to purchase the deer hunter third-party application since the contact already has a duck hunting application installed on his device. Thus, embodiments enable, without cost, an increase of traffic to a particular new game or a particular new application update.

In one embodiment, the concept of trading impressions is available for implementation. A third-party application may negotiate with another third-party application for an impression trade. For example, a bird watching application may trade impressions with a car driving application. For some fee, the car driving application will show promotions for the bird watching application at its car driving application, and vice versa. Or, in another embodiment, every time that a bird watching application provides a car driving application promotion at its application, then the car driving application will provide a bird watching promotion at its application. Thus, while the car driving application and the bird watching application are third-party applications, the server and/or the communication enabling application will act as a broker for the contract for the terms of an exchange of promotional material between the car driving application and the bird watching application. In other words, the broker (server and/or third party application) regulates the appearance of promotional material at each gaming application, according to a preprogrammed instructions (preprogrammed according to a contract between the owners of the third-party applications). In another embodiment, the owners of the third-party applications do not enter into a contract; embodiments create the promotional sharing events automatically, according to pre-programmed instructions (e.g., "Only advertise a first gaming application at a second gaming application that is sufficiently dissimilar to the first gaming application", wherein the "sufficiently" is determined according to a predetermined value made up of accumulated sums assigned to various events and circumstances.). Of note, there may any number of preprogrammed instructions for sharing promotional events.

In one embodiment, the server and/or the communication enabling application provides to a user of the third-party application any of, but not limited to being, the following: an availability of the contact's social profile; an availability of content sections of the third-party application; inserts to be placed within the gaming application while playing; and messaging services available to be used before, during and after the playing of the gaming application.

In one embodiment, a user of a device launches a third-party application. The third-party application, within its screen display to the user, has therein a "Connect" button to a communication enabling application (e.g., Tango™).

Thus, embodiments provide a method for increasing users of a communication enabling application.

In another implementation example, Charlie installs and/or plays a Sand Castle application. The Sand Castle application is co-branded with the communication enabling application, and thus is able to provide some of the functionalities provided by the communication enabling application. Charlie addresses an invitation to his daughter, Elise, to purchase the Sand Castle application; Charlie sends an audio/video message to Elise over the communication enabling application to encourage Elise to purchase the Sand Castle application. Elise receives the audio/video message by hearing and seeing Charlie invite her to play the Sand Castle application with him.

In another embodiment, the server and/or the communication enabling application provides messages that are shown during the playing of the third-party application. For example, these messages may be a report of a player's score. These messages encourage social interaction. This has the effect of encouraging players who are bored with the gaming application, to become re-engaged with the gaming application, thus extending the lifetime of the gaming application.

In another embodiment, the server and/or communication enabling application enables a player of a gaming application to request help with his/her play from contacts of the communication enabling application who are also playing the gaming application.

In one embodiment, a fee is charged, communicated through the server and/or the communication enabling application, when a user of a device, which has the communication enabling application installed thereon, invites a contact to participate in a third-party application that is also installed on the device. For example, a fee may be charged in any of the following, non-limiting ways: cost per click; cost per impression; and cost per install.

In one embodiment, a fee is charged, communicated through the server and/or the communication enabling application, to the third-party application developer for each installation of the developed third-party application that is a result of being invited via, directly or indirectly, the communication enabling application. Additionally, fees may be charged for messages that are sent via the server and/or communication enabling application and are "clicked" on by a contact associated with the communication enabling application. For example, a thousand third-party applications are installed due to invitations being issued through the server and/or the communication enabling application to contacts associated with the communication enabling application to purchase the third-party application; a fee is charged to the owner of the third-party application according to the methods for calculating the fee amounts described herein.

In another embodiment, a fee is charged by the number of buckets of messages sent. For example, in one embodiment, if less than a thousand messages were sent, it is predetermined that the sender of the messages is not to be charged a fee. However, if 50,000 messages were sent, then, in one embodiment, a going rate per message is charged to the user of the communication enabling application. In yet another embodiment, if a certain quantity of money for purchases is exceeded within a third-party application installed on the same device and using the same functionalities as the communication enabling application, then the account of the user of the device is charged.

Thus, embodiments use an invite mechanism, as well as a collaborative mechanism between the server, the communication enabling application and the third-party application, for generating a revenue stream.

Of significance, according to embodiments, it is not necessary for the users of the devices to be logged into the communication enabling application in order to receive the communication services normally provided by the communication enabling application. Thus, in one embodiment, the users of the devices interact with each other while playing using the same gaming application (accessed by both devices); the users are interacting with each other, using the messaging functionalities provided by the server described herein, without being logged into the communication enabling application (which is also installed on both devices).

Section One: An Authentication Intermediary and Method for Authenticating a Third-Party Application for Enabling Access to Messaging Functionalities Example Authentication Intermediary The communication enabling application is located at a device(s), such as, but not limited to, the following devices: mobile phone; tablet; desktop; and laptop. The communication enabling application provides messaging functionalities available for use to users of devices that have installed thereon the communication enabling application. Example messaging functionalities include, but are not limited to, the following: video conferencing, including audio and video streams; presenting message content in a selectable form, in a selectable view (See FIGS. 1 and 2 for first view and second view possibilities); presenting promotional language for enticing a user of a device to purchase an application; and monitoring compensation to be garnered from the purchase of an application that was promoted via the messaging functionalities.

Figure 5:
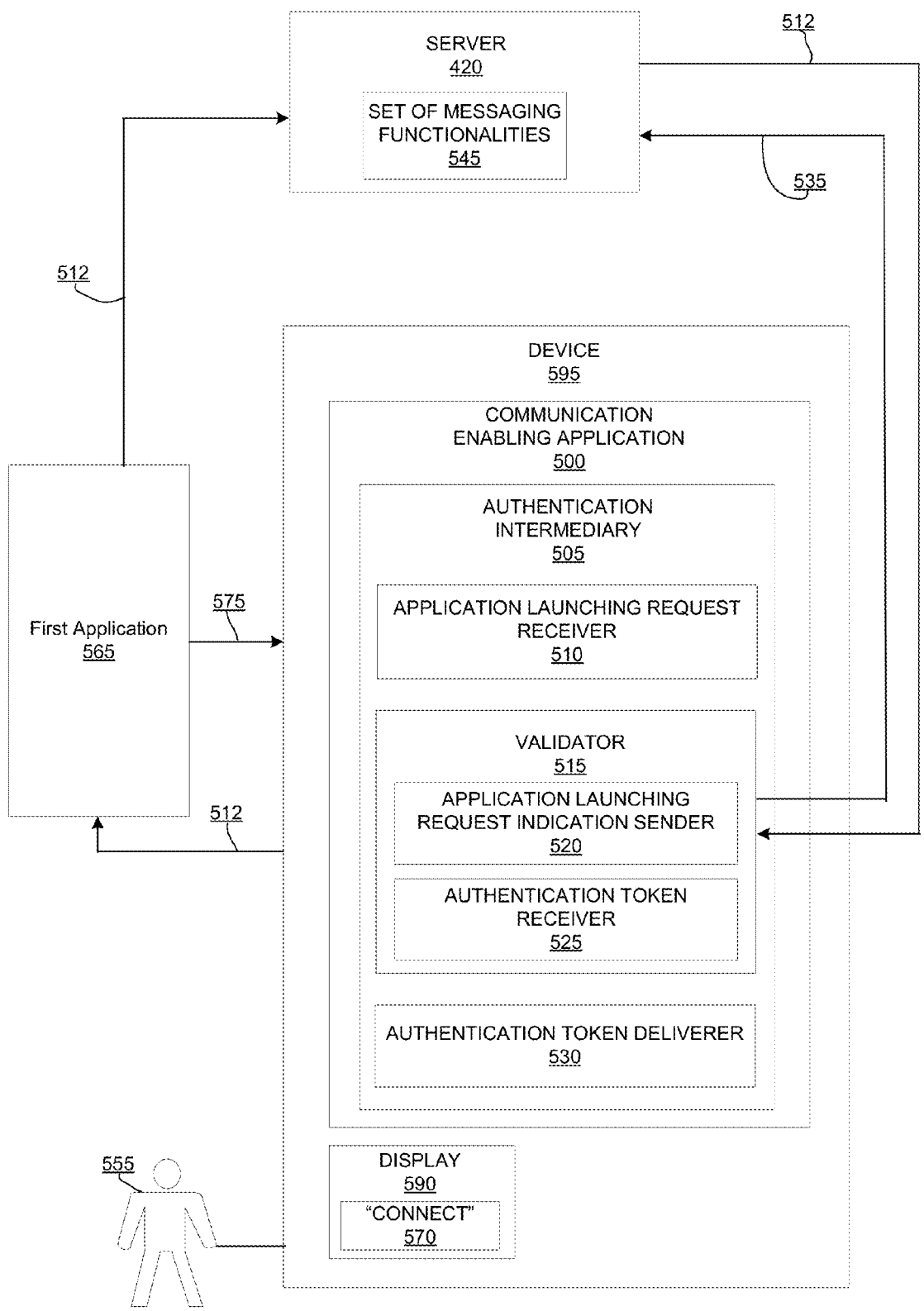
FIG. 5 is a block diagram of an authentication intermediary in accordance with an embodiment.
Figure 6:
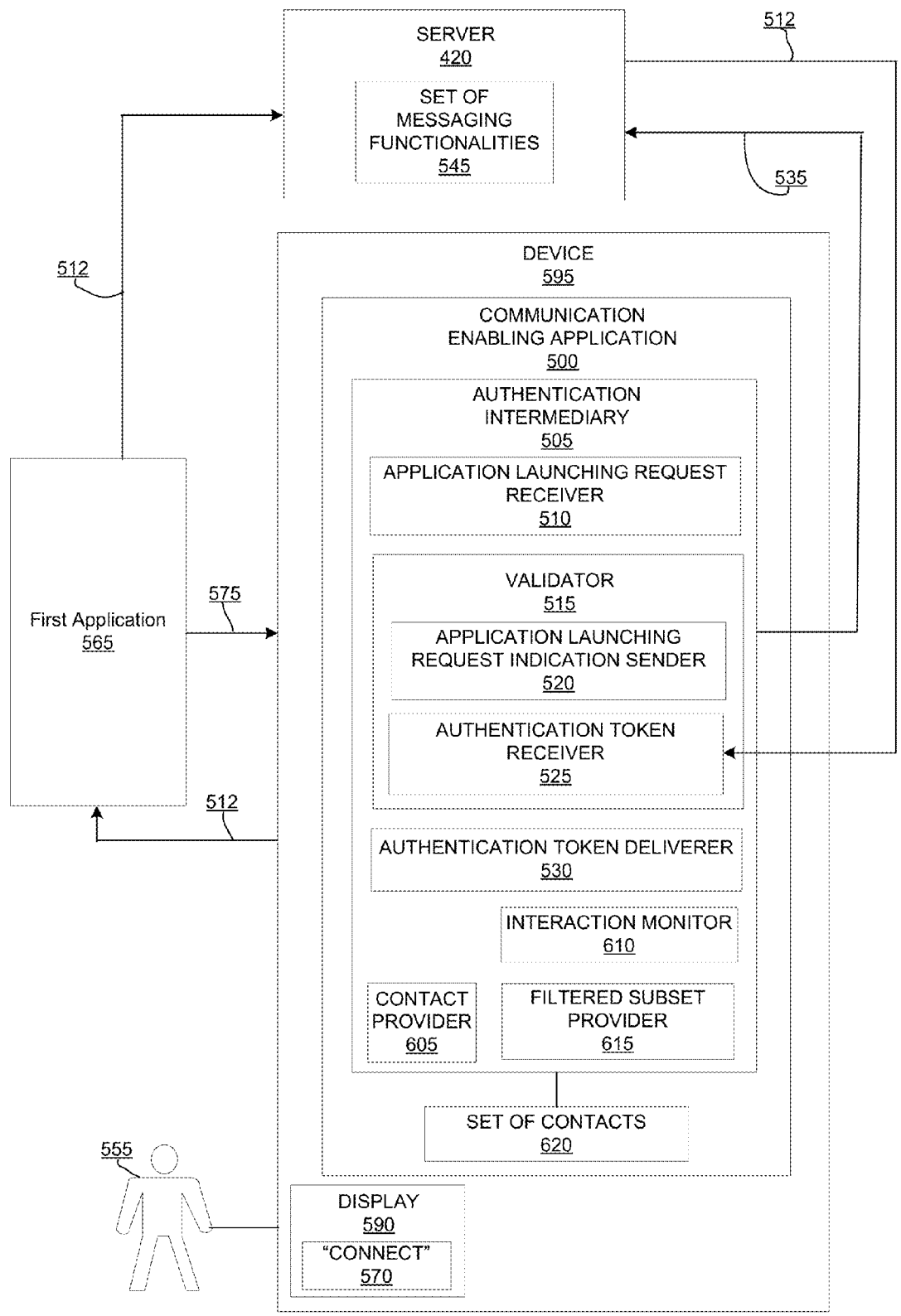
FIG. 6 is a block diagram of an authentication intermediary, in accordance with an embodiment.

An authentication intermediary is located at the communication enabling application. The authentication intermediary is the mediator of the exchange of authentication tokens between the third-party application, the communication enabling application and the server. The completion of this authentication token exchange provides the ability for the third-party application to access a server, and use, therefrom, the same messaging functionalities that are available for the communication enabling application to access and use. In another embodiment, the completion of this authentication token exchange provides the ability for the third-party application to access the server, and use, therefrom some of the same and some different messaging functionalities that are available for the communication enabling application to access and use. In yet another embodiment, the completion of the authentication token exchange provides the ability for the third-party application to access the server, and use, therefrom different messaging functionalities that are available for the communication enabling application to access and use FIGS. 5 and 6 illustrate an authentication intermediary 505 of a communication enabling application 500, in accordance with an embodiment. Of note, the communication enabling application 500 is that communication enabling application 405 described with relation to FIG. 4. The authentication intermediary 505 includes, and as will be described herein, the following: an application launching request receiver 510; a validator 515; and an authentication token deliverer 530. The validator 515, in accordance with embodiments, includes: an application launching request indication sender 520; and an authentication token receiver 525. In various embodiments, the authentication intermediary 505 optionally includes any of the following: a contact provider 605; an interaction monitor 610; and a filtered subset provider 615.

With reference still to FIGS. 5 and 6, the foregoing components of the authentication intermediary 505 will be discussed. Additionally, it should be noted that the "first application" 565, as will be discussed, refers to a third-party application. Whereas the "second application" 500 refers to a communication enabling application, such as, but not limited to, a Tango™ application.

The application launching request receiver 510 receives, at the second application 500, a first application launching request 575 for an establishment of a connection between the first application 565 and a server 540. The connection enables a set of messaging functionalities 545 that reside at the server 540 and that are available for implementation by the second application 500 to be available for implementation by the first application 565. The first application launching request 575, in one embodiment, is a result of the user 555 pressing on the "connect" button 570 appearing as a selectable button on a display 590, wherein the display is attached to, via wire and/or wirelessly, a device 595, and wherein the connect button 570 is associated with the first application 565. Of note, the device 595 includes the communication enabling application 500 installed thereon. The device 595 may be any device capable of providing a medium for communication over a network (e.g., mobile phone, tablet, personal computer, laptop, etc.). In one embodiment, overlaid on the icon that represents the first application 565 is the connect button 570. (It should be appreciated that any number of methods known in the art for making selections of data through a display screen at a device may be used.) The connect button 570 is selectable by any number of known selection means, including but not limited to, pressing, tapping, clicking, using a keyboard function, audible selections, etc. The "establishment of a connection" between the first application 565 and the server 540 refers to the establishment of a point of access for the first application 565 to access the messaging functionalities 545 at the server 540. This set of messaging functionalities 545 represent the same messaging functionalities available at the mobile devices 100 and 200 described in FIGS. 1 and 2. For example, the set of messaging functionalities 545 enable communication, via teleconferencing, that includes audio and video functions. Additionally, the set of messaging functionalities 545 includes the ability of the first application 565 to be displayed in various views (e.g., the first view and the second views of display screens described in FIGS. 1 and 2). Furthermore, more messaging functionalities (e.g., providing promotional offers, providing purchasing abilities) will be described herein with regard to the section discussing the server 540 below.

The validator 515 helps determine that the user 555 of the first application 565 is allowed to access the set of messaging functionalities 545 from the server 540. The validator 515 determines whether or not the user 555 of the device 595 is who the user 555 says that he/she is. The validator 515 initiates the creation of an authentication token 512. For example, the application launching request indication sender 520 sends an indication (as seen at 535), to the server 540, of the first application launching request 575. The server 540, recognizing that this indication 535 of the first application launching request 575 came from the second application 500 (the first application launching request 575 having been initiated by the user 555), returns an authentication token 512 to the second application 500. The authentication token 512, represents what would be an authentication pass that allows the first application 565 access to the set of messaging functionalities 545 at the server 540, if delivered to the server 540 from the first application 565.

Of note, the authentication token 512, in one embodiment, may be revoked, in various instances. For example, if it is determined that that system needs to be more secure and/or the system was not very secure initially, then embodiments may require that the authentication token 512 expire within two minutes, which would require an almost immediate authentication to occur. However, in another embodiment, the authentication token 512 may be programmed not expire for an entire year.

The authentication token receiver 525 receives the authentication token 512 from the server 540. The authentication token deliverer 530, of the second application 500, delivers the authentication token 512 to the first application 565.

In one embodiment, the contact provider 605 provides a set of contacts to the first application 565, wherein the set of contacts 620 is associated with the second application 500. The set of contacts 620 is at least a portion of those contacts known to the second application 500 to also be using the second application 500. It should be appreciated that the set of contacts 620 may be one or more contacts. The set of contacts 620 represents users (which include the set of contacts 620) of other devices on which the second application 500 (a.k.a., the communication enabling application described herein [See FIGS. 1-3]), is installed. In another embodiment, the set of contacts 620 includes a list of contacts (associated with other devices) that reside at the device 595, but do not have the same communication enabling application installed on their devices as that communication enabling application 500 that is installed on the device 595.

The interaction monitor 610 monitors the interaction between the set of contacts 620 associated with the second application 500 and the user 555 of the second application 500. The interaction that is being monitored includes any of the following types of interaction: a quantity of messages (e.g., text, voice) exchanged between the user 555 of the second application 500 and the set of contacts 620; the quantity of time per message exchanged between the user 555 of the second application 500 and the set of contacts 620; and the temporal factors (e.g., weekday, weekend, business hours) associated with messages exchanged between the user 555 of the second application 500 and the set of contacts 620.

The filtered subset provider 615 provides, to the first application 565, filtered subsets of the set of contacts 620 of the first application 565, based on the monitoring performed by the interaction monitor 610. For example, the filtered subset provider 615 may analyze the monitored calls between the user of the device upon which the second application 500 is installed and the set of contacts 520, and group together, according to preprogrammed instructions, those contacts of the set of contacts 520 for which the calls lasted longer than 2 minutes. As will be discussed herein, embodiments may send customized messages to the resulting filtered contacts.

Of note, the server 540 and the first application 565 (a.k.a., third-party application) both provide stores for holding information, such as, but not limited to, pictures, XML, messages, etc. Further, the stores may also hold a list of virtual items that the user 555 of the device 595 has purchased and/or of which the user 555 has ownership. Additionally, the stores may also store a list of items that have not yet been purchased by anyone. Once the authentication token 512 is delivered to the server 540, the tango server 540 shares the information that it has with the first application 565 and also provides messaging functionalities 545 for the use by the first application 565.

In one embodiment, a user 555 of the device 595 having the communication enabling application 500 thereon may opt out of providing personal information about his/her interaction with the first application 565 or other third-party applications. Various options are provided to give the user 555 choices on what information he/she will allow to be revealed. In one embodiment, a list of on/off buttons are provided to the user 555 for selection, the selection of which either allows or disallows certain data is to be disclosed. In various embodiments, these choices may be presented to the user on a case by case basis, or a certain "default" decision (e.g., always "on" unless deactivated to "off") may be chosen and is activated unless deactivated. Thus, a player's score, in embodiments, may always be shared, sometimes be shared or never be shared, depending on the user's/player's preferences.

Figure 7:
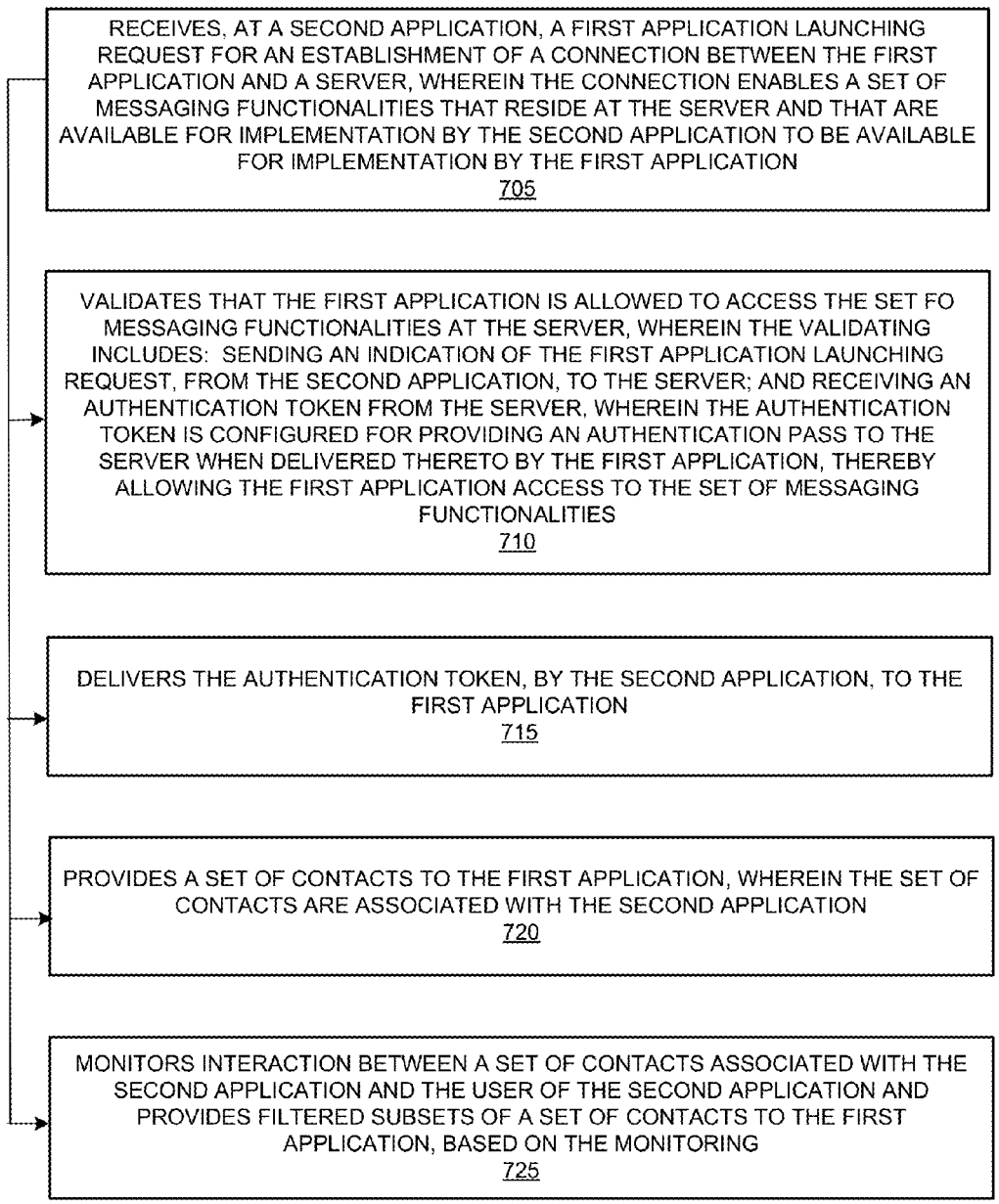
FIG. 7 is a flow diagram for a method for authenticating a third-party application for enabling access to messaging functionalities, in accordance with an embodiment.

Example Operation of Method for Authenticating a Third-Party Application for Enabling Access to Messaging Functionalities The following discussion sets forth in detail some example methods of operation of embodiments. With reference to FIGS. 5-7, the flow diagram of method 700 illustrates an example procedure used by various embodiments. Method 700 includes some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in method 700, such procedures are examples. That is, embodiments are well suited to performing various other procedures or variations of the procedures recited in method 700, alone or in combination. Likewise, in some embodiments, the procedures in method 700, alone or in combination, may be performed in an order different than presented and/or not all of the procedures described in one or more of these flow diagrams may be performed. It is further appreciated that procedures described in method 700, alone or in combination, may be implemented in hardware, or a combination of hardware with firmware and/or software.

FIG. 7 is a flow diagram of a method 700 for authenticating a third-party application for enabling access to messaging functionalities, in accordance with an embodiment. Although specific procedures are disclosed in method 700, embodiments are well suited to performing various other procedures or variations of the procedures recited in method 700. It is appreciated that the procedures in method 700 may be performed in an order different than presented, that not all of the procedures in method 700 may be performed, and that additional procedures to those illustrated and described may be performed. All of, or a portion of, the procedures described by method 700 can be implemented by a processor or computer system executing instructions which reside, for example, on computer-usable/readable media. The following discussion of method 700 references FIGS. 5, 6 and 7 unless specifically noted otherwise.

At step 705 of method 700, in one embodiment and as described herein, a first application launching request 575 is received at the second application 500. The first application launching request 575 is for an establishment of a connection between the first application 565 and a server 540. The connection enables the set of messaging functionalities 545 that reside at the server 540 and that are available for implementation by the second application 500 to be available for implementation by the first application 565.

At step 710 of method 700, in one embodiment and as described herein, a validation of the user 555 of the first application 565 is allowed to access the set of messaging functionalities 545. The validating, at step 710 includes: sending an indication of the first application launching request 575, from the second application 500, to said server 540; and receiving an authentication token 512 from the server 540, wherein the authentication token 512 is configured for providing an authentication pass to the server 540 when delivered thereto by the first application 565, thereby allowing the first application 565 access to the set of messaging functionalities 545.

At step 715 of method 700, in one embodiment and as described herein, the authentication token 512 is delivered, by the second application 500, to the first application 565.

At step 720 of method 700, in one embodiment and as described herein, the set of contacts 620 is provided to the first application 565, wherein the set of contacts 620 is associated with the second application 500. It should be appreciated, and as is described herein, that the set of contacts 620, in various embodiments, may or may not have the communication enabling application installed thereon as the communication enabling application 500 installed on the device 595. In this manner, and as will be described herein with respect to Section 2 below, when the set of contacts are used by the first application 565 (a.k.a., third party application) to send to one of more contacts of the set of contacts 620 promotional material encouraging the one or more contacts to purchase the first application 565, if these contacts do not have the communication enabling application installed thereon, these contacts may also receive promotional material encouraging these contacts to install the communication enabling application.

At step 725 of method 700, in one embodiment and as described herein, the interaction between the set of contacts 620 associated with the second application 500 and the user 555 of the second application 500 is monitored. Based on this monitoring, filtered subsets of the set of contacts 620 are provided to the first application 565. In one embodiment, the monitoring of the interaction at step 725 includes monitoring any of the following: a quantity of messages exchanged between the user of the first application 565 and the set of contacts 620; a quantity of time per message exchange between the user 555 of the first application 565 and the set of contacts 620; and temporal factors associated with message exchanges between the user 555 of the first application 565 and the set of contacts 620.

Thus, embodiments provide a system and method for providing an intermediary for authenticating a third-party application for enabling access to messaging functionalities, through the exchange of an authentication token 512 between the server 540, the second application 500 (a.k.a., communication enabling application 500) and the first application 565 (a.k.a., third-party application).

Figure 8:
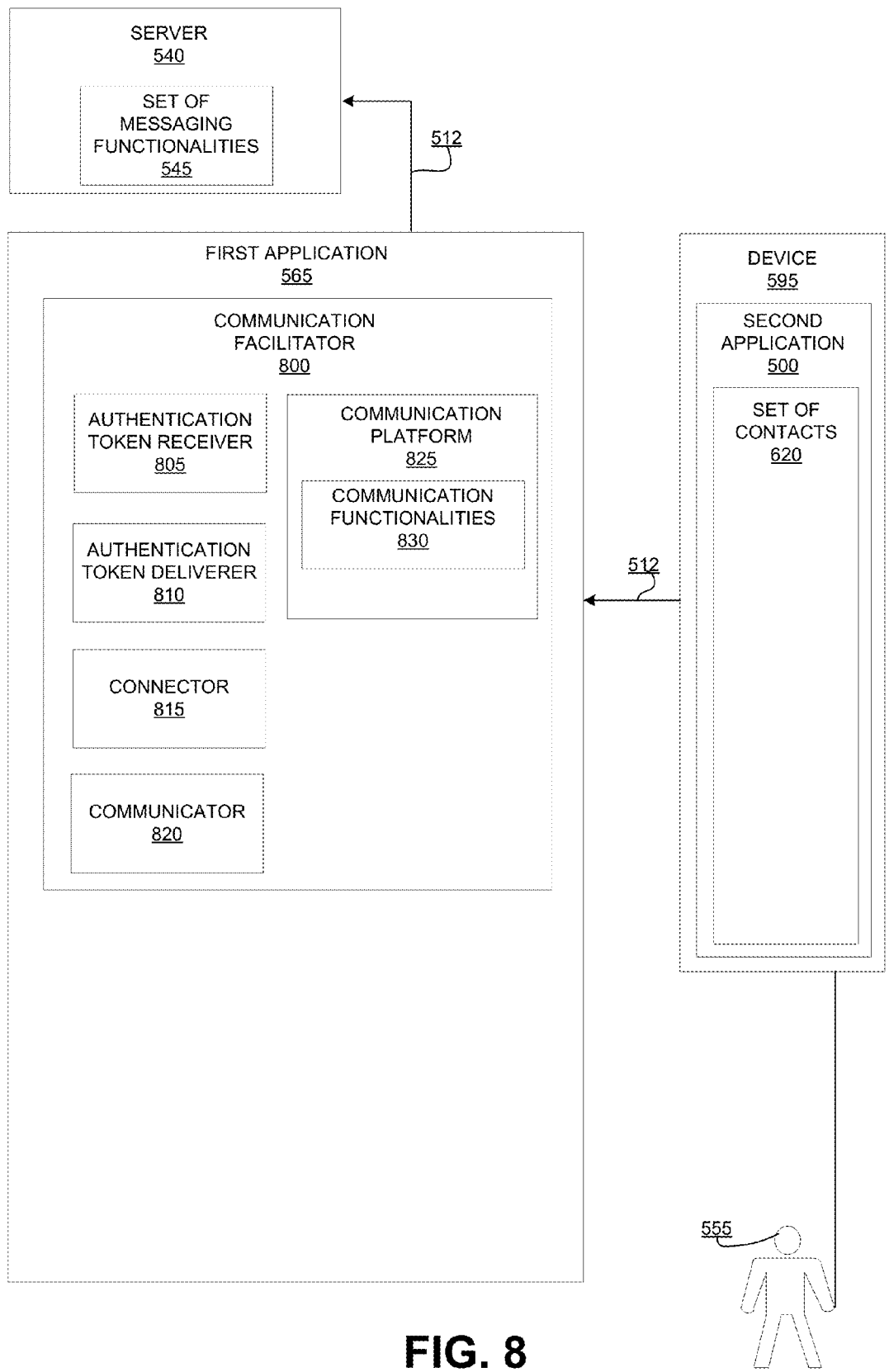
FIG. 8 is a block diagram of a communication facilitator, in accordance with an embodiment.
Figure 9:
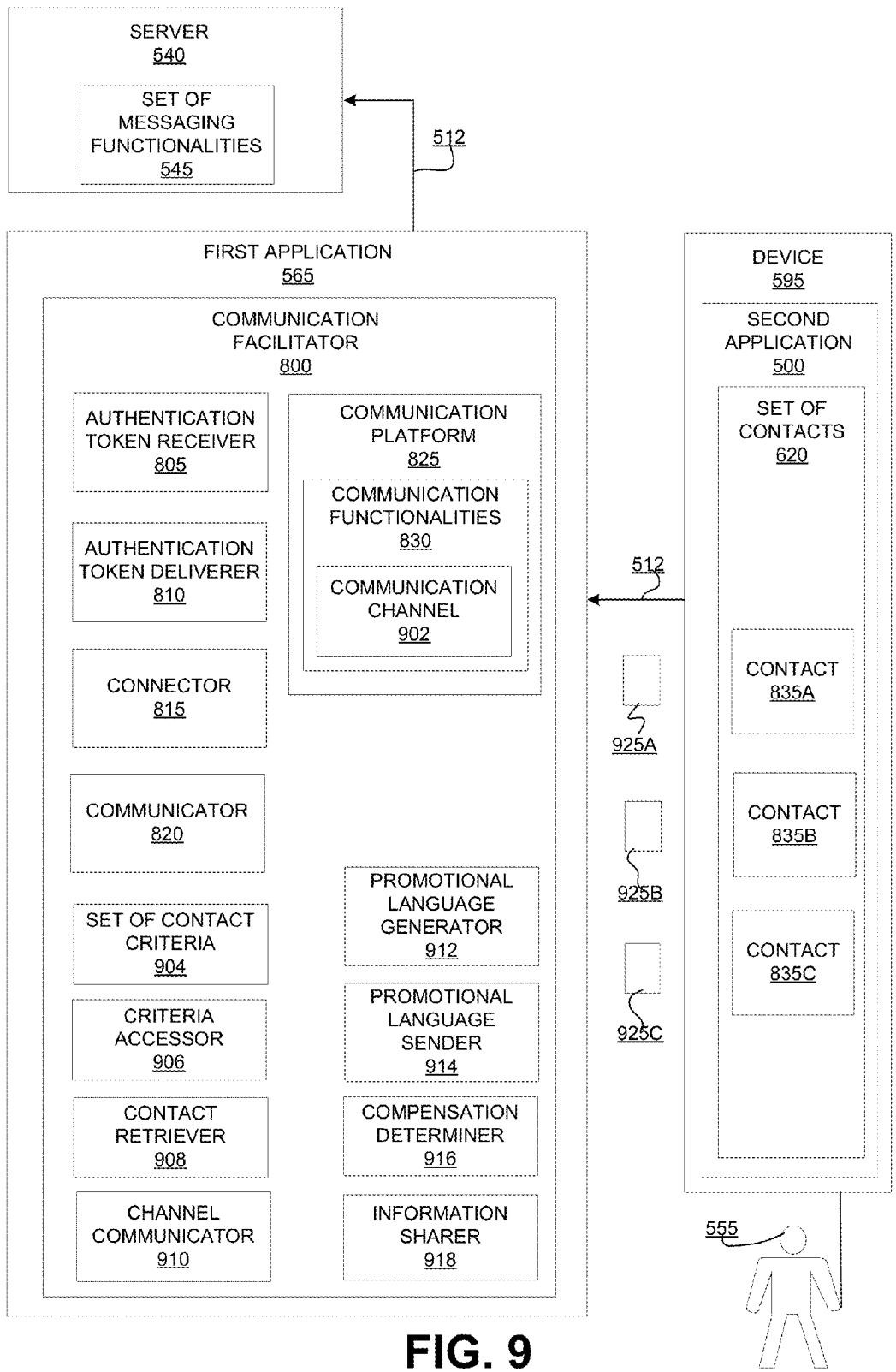
FIG. 9 is a block diagram of a communication facilitator, in accordance with an embodiment.

Section Two: A Communication Facilitator and Method for Enabling Engagement Between a First Application on a Device and a Set of Contacts Associated with a Second Application on the Device Example Communication Facilitator FIGS. 8 and 9 illustrate a communication facilitator 800, in accordance with an embodiment. The communication facilitator 800 is located at the first application 565 (a.k.a., third-party application). The communication facilitator 800 includes, and as will be described herein: an authentication token receiver 805; an authentication token deliverer 810; a connector 815; and a communicator 820. In various embodiments, the communication facilitator 800 optionally includes any of the following: a criteria accessor 906; a contact retriever 908; a channel communicator 910; a promotional language generator 912; a promotional language sender 914; a compensation determiner 916; and an information sharer 918.

With reference still to FIGS. 8 and 9, the foregoing components of the communication facilitator 800 will be discussed. The authentication token receiver 805 receives, at the first application 565, an authentication token (e.g., authentication token 512 of FIGS. 5 and 6.) from the second application 500. The authentication token 512 provides an authentication pass to the server 540, when delivered thereto by the first application 565. The authentication token 512, providing "an authentication pass", once delivered to the server 540, allows the first application 565 to access the set of messaging functionalities 545 available at the server 540. The authentication token 512 that was sent to the second application 500 by the server 540 identifies, and thereby validates, the user 555 (verifies that the user 555 is who the user 555 says that he/she is) of the second application 500; upon validation, information is allowed to flow from the server 540 to the first application 565 (that also resides on the device 595 of the user 555). Such validation also allows the first application 565 to access contacts 835 (for example, contacts 835A, 835B, and 835C) from the list of the set of contacts 620, while using the set of messaging functionalities 545 available at the server 540 and the communication platform 825 located at the communication facilitator 800.

The authentication token deliverer 810 delivers the authentication token 512 to the server 540.

The connector 815, after the authentication token 512 having been verified by the server 540, connects, using the communication platform 825, to the server 540, wherein the communication platform 825 includes communication functionalities that enable communication with other devices. The communication functionalities of the communication platform 825 operate in cooperation with the set of messaging functionalities 545 and enable the communication with the other devices, that may be mobile devices, tablets, etc.

The communicator 820 communicates with the set of contacts 620 associated with the second application 500 using, via the communication platform 825, at least one messaging functionality of the set of messaging functionalities 545.

In one embodiment, the criteria accessor 906 accesses a set of contact criteria 904 at the first application 565, wherein the set of contact criteria 904 defines for which of the contacts from the set of contacts 835 that contact information is to be retrieved. The set of contact criteria 904 may be, but is not limited to being, any of the following: one or more predefined interactions between the user 555 and at least one contact of the set of contacts 620; one or more predefined interactions between at least one contact of the set of contacts 620 and applications other than the second application 500; a defined relationship with the user 555 (e.g., mother, father, son, daughter, best friend), wherein the relationship is defined within the second application 500; and a predefined threshold score for a gaming application.

In one embodiment, the second application 565 stores information regarding the set of contacts 620, including, but not limited to, the following: interaction history of at least one contact of the set of contacts 620 with the user 555 and/or with other applications (e.g., purchasing history, scoring history, messaging history with the user, etc.); and a predefined relationship with the user 555. In another embodiment, the server 540 stores information regarding the set of contacts 620 for the foregoing instances. The server 540 may store different types of content in differing forms, such as, but not limited to being: pictures; text; XML; and video.

In one embodiment, the contact information refers to information indicating how to contact at least one contact of the set of contacts 620. For instance, the contacts' phone number may be retrieved.

In one embodiment, the contact retriever 908 retrieves the corresponding contact information 920 for contacts, based upon the set of contact criteria 904.

In one embodiment, the channel communicator 910 communicates, via a communication channel 902 of the communication platform 825, with the contacts 835A, 835B and 835C located at a plurality of devices 925 (plurality of devices 925A, 925B and 925C, respectively), other than the first device, such as device 595. The communication channel 902 is a secure channel enabling communication from the first application 565 to at least one contact of the set of contacts 620. The communication channel 902 is just one communication functionality 830 making up the communication platform 825. Other communication functionalities include, but are not limited to being such, the following (and as will be described below): presenting to users of other devices 925 purchasing information; and providing a means for receiving compensation for a predefined occurrence. With reference to FIGS. 8 and 9, contact 835A controls device 925A, contact 835B controls device 925B and contact 835C controls device 925C.

In one embodiment, the promotional language generator 912 sends promotional language to at least one contact of the set of contacts 620. The promotional language supports a purchase of the first application 565 by the at least one contact. For example, a promotional language generator 912 sends encouraging words, such as, "Buy this app., it's great!", to Bob, a friend of Bill's (the user 555). It should be appreciated that the promotional language may be any type of language that encourages the purchase of the third-party application. This promotional language may be such that it includes a discounted offer, an offer with a reward (gift) as an incentive, a description of the contact's peer group using the application, etc.

In one embodiment, the promotional language sender 914 sends the promotional language to the at least one contact.

In one embodiment, the compensation determiner 916 determines compensation to be received for generating the promotional language and/or the purchase of the first application 565 by the at least one contact. For example, in one embodiment, each time that the communication facilitator 800 generates promotional language to influence a contact to purchase the first application 565, the owner of the second application 500 receives a preset amount in compensation. In one embodiment, this compensation can be money, such as one dollar for each time promotional language is sent to a contact. For instance, if the communication facilitator 800 sends five instances of promotional language to five different contacts on the list of the set of contacts 620, and it is predetermined that each time promotional language is sent out regarding the first application 565 the owner(s) of the first application 565 owe the owner(s) of the second application 500 one dollar, then the owners of the first application 565 owe the owners of the second application 500 five dollars.

In another example, in one embodiment, each time that a contact purchases an application download for his device, such as purchasing the first application 565, in response to promotional language being sent to the contact, then it is predetermined that the owner of the purchased application downloaded owes the owner of the second application 500 two dollars. In one embodiment, it is predetermined (a.k.a., preprogrammed) that if the time that has expired between the promotional language being sent and the application download being purchased is less than five minutes, then it is determined that the first application 565 was purchased in response to the promotional language being sent. In this scenario, the threshold time value is considered to be five minutes. Of note, it should be appreciated that the threshold time value may be any time value determined via the owner of the purchased application download and the owner of the second application 500. The reference to "owner" in the context of the owner of the first application 565 and the owner of the second application 500 refers to the entity that is entitled to receive compensation. This may be the entity that owns the legal rights to the application, even if an entity other than the owner is entitled to receive compensation on behalf of the owner. Thus, even if entity "A" owns an application "Z" and the right to distribute application "Z" for compensation, if entity "A" contracts with entity "B" such that entity "B" is to receive the revenue generated from the sales of application "Z", then, at least for purposes of this application, even if a purchaser directly pays entity "B" for the download of application "Z", the owner, entity "A" is still considered to have received appropriate compensation for the sale of application "Z" (even though the money payment went directly to entity "B").

In one embodiment, compensation representing a percentage of a purchase price of the first application 565 is determined if a threshold time frame is met, wherein the threshold time frame includes a time period between a sharing of information relating to the first application and the purchase of the first application by the at least one contact. For example, the percentage, in terms of compensation, of the purchase price of an application download is predetermined to be fifty percent of an application download, with the following condition: the time period between the sharing of information relating to the first application 565 and the purchase of the first application 565 by the at least one contact of the set of contacts 835 from the list of the set of contacts 620 is within a predetermined time period. If the application download cost eight dollars, the preprogrammed time period is ten minutes, and the time between the sharing of the information relating to the first application 565 and the purchase of the first application 565 by the at least one contact 835B is measured at eight minutes, then it is determined that the compensation owed to the owner of the second application 565 by the owner of the first application 565 is four dollars (which is fifty percent of eight dollars). In various embodiments, the information that is shared may be any information associated with the first application 565, such as, but not limited to being: other contacts of the user 555 using the first application 565; the gaming scores of other users of the first application 565; and information about a gaming application (e.g., popularity, ease of play, length of time to play).

In one embodiment, a percentage of the purchase price is determined to be the money to be received for each time promotional language is sent and/or an application is purchased as a result of the promotional language that was sent. For example, if an application download is purchased for two dollars and the percentage compensation value is ten percent, then the owner of the first application 565 owes the owner of the second application 500 twenty cents.

In one embodiment, an information sharer 918 shares, via the communication channel 902, information relating to the first application 565, wherein the sharing includes sending the information relating to the first application 565 to the at least one contact of the contacts of the set of contacts 835, such as, but not limited to, the following information: popularity; ease of play; and length of time to play.

Figure 10:
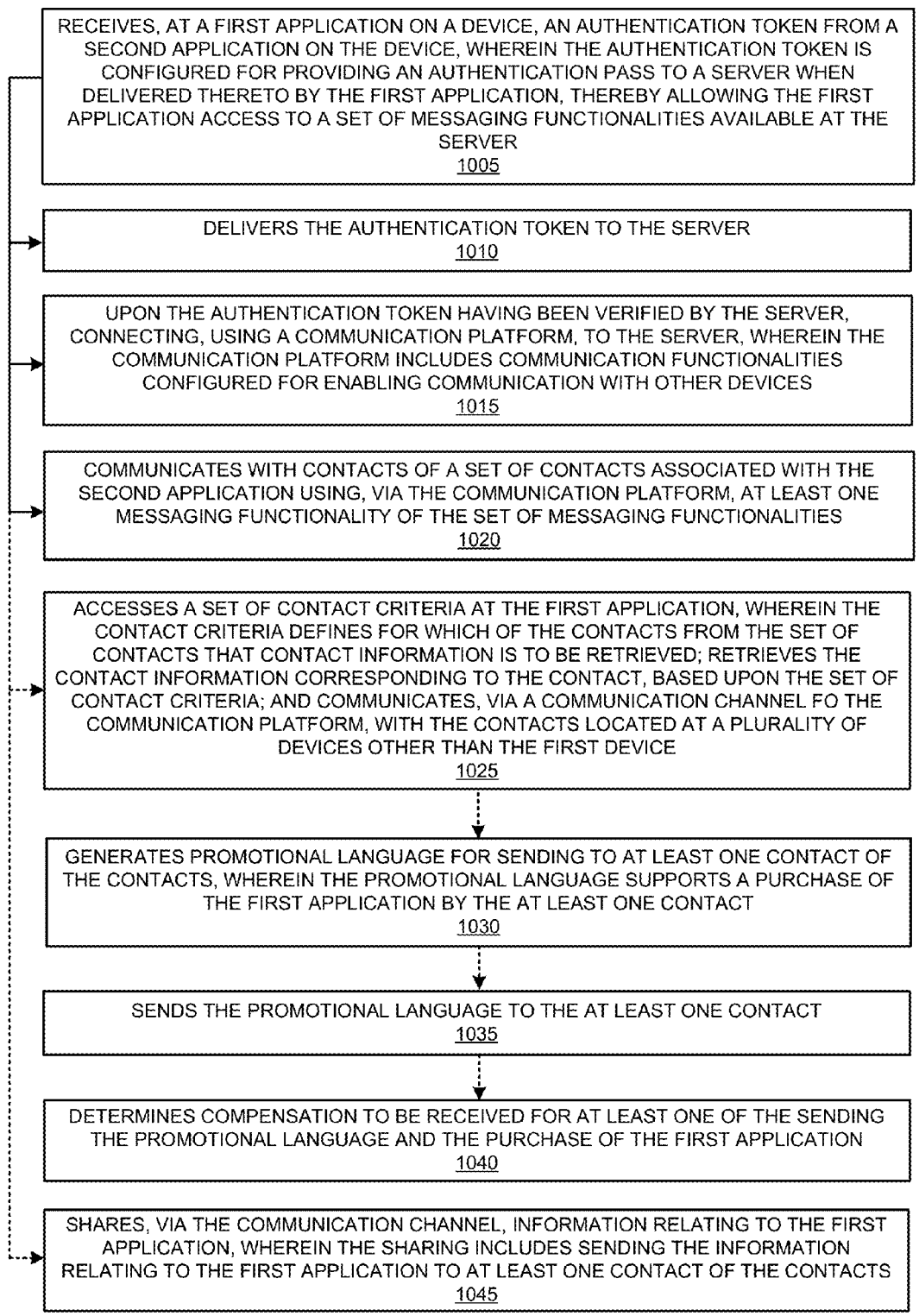
FIG. 10 is a flow diagram of a method for enabling engagement between a first application on a device and a set of contacts associated with a second application on the device, in accordance with an embodiment.

Example Method for Enabling Engagement Between a First Application on a Device and a Set of Contacts Associated with a Second Application on the Device The following discussion sets forth in detail some example methods of operation of embodiments. With reference to FIGS. 8-10, the flow diagram of method 1000 illustrates an example procedure used by various embodiments. Method 1000 includes some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in method 1000, such procedures are examples. That is, embodiments are well suited to performing various other procedures or variations of the procedures recited in method 1000, alone or in combination. Likewise, in some embodiments, the procedures in method 1000, alone or in combination, may be performed in an order different than presented and/or not all of the procedures described in one or more of these flow diagrams may be performed. It is further appreciated that procedures described in method 1000, alone or in combination, may be implemented in hardware, or a combination of hardware with firmware and/or software.

FIG. 10 is a flow diagram of a method 1000 for performing a method for enabling engagement between a first application on a device and a set of contacts associated with a second application on the device, in accordance with an embodiment. Although specific procedures are disclosed in method 1000, embodiments are well suited to performing various other procedures or variations of the procedures recited in method 1000. It is appreciated that the procedures in method 1000 may be performed in an order different than presented, that not all of the procedures in method 1000 may be performed, and that additional procedures to those illustrated and described may be performed. All of, or a portion of, the procedures described by method 1000 can be implemented by a processor or computer system executing instructions which reside, for example, on computer-usable/readable media. The following discussion of method 1000 references FIGS. 8, 9 and 10 unless specifically noted otherwise.

At step 1005 of method 1000, in one embodiment and as described herein, an authentication token 512 is received at the first application 565 from the second application 500, wherein the authentication token 512 is configured for providing an authentication pass to the server 540 when delivered thereto by the first application 565, thereby allowing the first application 565 access to a set of messaging functionalities 545 available at the server 540.

At step 1010 of method 1000, in one embodiment and as described herein, the authentication token 512 is delivered to the server 1010.

At step 1015 of method 1000, in one embodiment and as described herein, upon the authentication token 512 having been verified by the server 540, the first application 565 is connected to, using the communication platform 825, the server 540, wherein the communication platform 825 includes communication functionalities 830 configured for enabling communication with other devices.

At step 1020 of method 1000, in one embodiment and as described herein, the first application 565 communicates with contacts of the set of contacts 620 associated with the second application 500 using, via the communication platform 825, at least one messaging functionality of said set of messaging functionalities 545.

At step 1025 of method 1000, in one embodiment and as described herein, the method 1000 further optionally includes: accessing a set of contact criteria 904 at the first application 565, wherein the set of contact criteria 904 defines for which of the contacts from the set of contacts 620 that contact information 920 is to be retrieved; retrieving the contact information 920 corresponding to the contacts, based upon the set of contact criteria 904; and communicating, via the communication channel 902 of the communication platform 825, with the contacts located at a plurality of devices other than the first device, such as device 595.

At step 1030 of method 1000, including the operation at step 1025, in one embodiment and as described herein, promotional language is generated for sending to at least one contact of the contacts, wherein the promotional language supports a purchase of the first application 565 by at least one contact of the set of contacts 620.

At step 1035 of method 1000, including the operation at step 1030, in one embodiment and as described herein, the promotional language is sent to at least one contact.

At step 1040 of method 1000, including the operation at step 1035, in one embodiment and as described herein, compensation to be received for the sending of the promotional language and/or the purchase of the first application 565 is determined. In one embodiment, money is determined to be received. In another embodiment, the compensation represents a percentage of a purchase price of the first application 565. In yet another embodiment, the compensation represents a percentage of a purchase price of the first application 565 if a threshold time frame is met, wherein the threshold time frame includes a time period between a sharing of information relating to the first application 565 and the purchase of the first application 565 by at least one contact.

At step 1045 of method 1000, including the operation at step 1040, in one embodiment and as described herein, the information relating to the first application 565 is shared, via the communication channel 902, wherein the sharing includes sending the information relating to the first application 565 to at least one contact of the contacts of the set of contacts 620

In one embodiment, the server 540 includes monitoring the third-party applications installed on the same device at which the first application 565 (a.k.a. communication enabling application) is installed. Through this monitoring, the server 540 is able to determine the device's interaction with third-party applications. Thus, in one embodiment, the server 540 is able to determine if a group of a set of contacts has the same third-party application (e.g., gaming application) installed. This information is accessed (sent or retrieved) by the authentication intermediary 505, in one embodiment, and used to provide a set of contacts 620 which may be of interest and use to the user 555 of the device 595. For example, the set of contacts 620, each of whom have a device with the same third-party application installed, is invited to become part of a leader board, since each contact of the set of contacts 620 has a device with the third-party application installed thereon. Additionally, every contact of the set of contacts 620 may be sent promotional material geared toward selling game accessories (e.g., avatars, rock smashing tools) for use with the third-party application.

Thus, embodiments provide a system and method for enabling engagement between a first application on a mobile device and a set of contacts associated with a second application on the mobile device.

Figure 11:
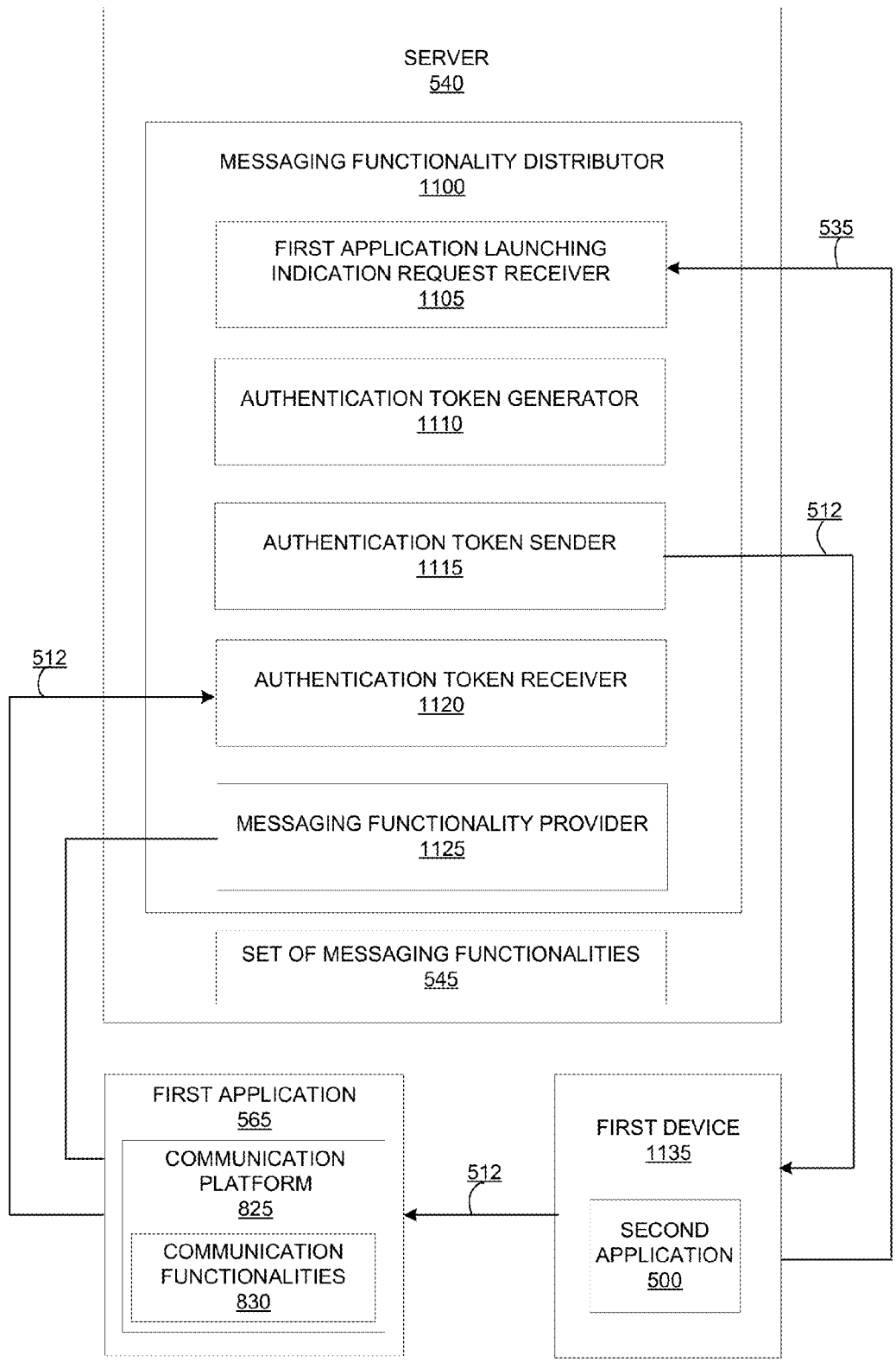
FIG. 11 is a block diagram of a messaging functionality distributor, in accordance with an embodiment.

Section Three: A Messaging Functionality Distributor and Method for Generating Revenue by Growing Sales of Third-Party Applications Example Messaging Functionality Distributor FIG. 11 illustrates a messaging functionality distributor, in accordance with an embodiment. The messaging functionality distributor 1100 is located at a server 540. The server 540 supports the messaging functions of a communication enabling application (e.g., Tango™), such as the second application 500. As will be further described herein, the messaging functionality distributor 1100 includes the following: a first application launching indication request receiver 1105; an authentication generator 1110; an authentication token sender 1115; an authentication token receiver 1120; and a messaging functionality provider 1125. The server 540 further includes messaging functionalities 1130.

It should be noted, as discussed herein, that the first application 565 refers to a third-party application, while the second application 500 refers to a communication enabling application. In one embodiment, the first application 565 includes the communication platform 825, as is already discussed herein. In one embodiment, the communication platform 825 includes the communication functionalities 830, as is already discussed herein. In one embodiment, the second application 500 is located at a first device 1135. The first device 1135, in one embodiment, is the device 595 discussed with reference to FIGS. 5-10. The first application 565 is located, in one embodiment, at the first device 1135. In another embodiment, the first application 565 is located at a server separate from the server 540 and separate from the first device 1135; however, the first device 1135 is configured to access the first application 565 via a network (not shown).

The first application launching indication request receiver 1105 is coupled to the server 540. The first application launching indication request receiver 1105 receives, from the second application located at a first device 1135, an indication of a first application launching request 575 (See FIGS. 5 and 6), as is described herein. The server 540 includes a set of messaging functionalities 545 (one or more messaging functionalities) that are available for implementation by the second application 500 and are available for implementation by the first application 565 upon delivery of the authentication token 515 from the first application to the server 540. It should be appreciated that the server 540, in one embodiment, has stored thereon more and/or different messaging functionalities that are available for implementation at and through the first application 565 than those messaging functionalities available for implementation at and through the second application 500.

The authentication token generator 1110, based on the first application launching request 575, generates the authentication token 512, wherein the authentication token 512 provides an authentication pass to the server 540 when delivered thereto by the first application 500, thereby allowing the first application 500 access to the messaging functionalities 545 located at the server 540.

The authentication token sender 1115 sends the authentication token 512 to the second application 500 for delivery to the first application 565. The second application 500 then delivers the authentication token 512 to the first application 565.

The authentication token receiver 1120 receives the authentication token 512 from the first application 565.

The messaging functionality provider 1125 provides access to the set of messaging functionalities 545 for implementation by the first application 500. The messaging functionalities 545 are communicated over a communication platform 825 of the first application 565, wherein said communication platform 825 includes communication functionalities 830 that enable communication with a second device, wherein the first device 1135 and the second device are different. In various embodiments, the second device is any device capable of communicating with the first device via teleconferencing, such as a mobile phone, a tablet, a desktop computer, a laptop computer, etc.

As is described herein, the set of messaging functionalities includes any, but are not limited to, the following: communication in video form; communication in audio form; a presentation of a portion of the first application 565 in a selected view; and presenting promotional language to a second device, wherein the promotional language promotes a purchase of an application by a user of the second device, wherein the first device 1135 and the second device are different. In one embodiment, the third-party application that is being promoted to be purchased is different from the first application 565. For example, the third-party application may be in the same genre as the first application 565. For instance, if the first application 565 is an airplane flying application, then the third-party application being promoted may be a helicopter flying application. This cross-promotional concept is discussed herein in Section Two above. As is also discussed in Section Two above, compensation for the presentation of such promotional language to another device is calculated, in one embodiment, according to various preprogrammed methods. Upon the sale of an installment of the first application 565 on a second device (that is different from the first device 1135), a portion of this compensation, in one embodiment, is sent to the owner of the second application 500, while another portion is sent to the owner of the first application 565.

Example Operation of a Method for Generating Revenue by Growing Sales of Third-Party Applications The following discussion sets forth in detail some example methods of operation of embodiments. With reference to FIGS. 12A and 12B, the flow diagrams of methods 1200 and 1230, respectively, illustrate an example procedure used by various embodiments. Methods 1200 and 1230 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in methods 1200 and 1230, such procedures are examples. That is, embodiments are well suited to performing various other procedures or variations of the procedures recited in methods 1200 and 1230, alone or in combination. Likewise, in some embodiments, the procedures in methods 1200 and 1230, alone or in combination, may be performed in an order different than presented and/or not all of the procedures described in one or more of these flow diagrams may be performed. It is further appreciated that procedures described in methods 1200 and 1230, alone or in combination, may be implemented in hardware, or a combination of hardware with firmware and/or software.

FIGS. 12A and 12B are flow diagrams of methods 1200 and 1230, respectively, for performing a method for generating revenue by growing sales of third-party applications, in accordance with an embodiment. Although specific procedures are disclosed in methods 1200 and 1230, embodiments are well suited to performing various other procedures or variations of the procedures recited in methods 1200 and 1230. It is appreciated that the procedures in methods 1200 and 1230 may be performed in an order different than presented, that not all of the procedures in methods 1200 and 1230 may be performed, and that additional procedures to those illustrated and described may be performed. All of, or a portion of, the procedures described by methods 1200 and 1230 can be implemented by a processor or computer system executing instructions which reside, for example, on computer-usable/readable media. The following discussion of methods 1200 and 1230 references FIGS. 5-12B unless specifically noted otherwise.

At step 1205 of method 1200, in one embodiment and as described herein, the server 540 that is communicatively coupled with said second application 500 receives from the second application 500, that is located at a first device 1135, an indication of the first application launching request 575. The server 540 includes a set of messaging functionalities 545 that is available for implementation by the second application 500 and is available for implementation by the first application 565 upon delivery of the authentication token 512 from the first application 565 to the server 540. In one embodiment, the set of messaging functionalities that is available, at the server 540, for implementation by the second application 500 is the same as the set of messaging functionalities that is available, at the server 540, for implementation by the first application 565. However, in another embodiment, the set of messaging functionalities that is available, at the server 540, for implementation by the second application 500 is different than the set of messaging functionalities that is available, at the server 540, for implementation by the first application 565. For example, in one embodiment, the set of messaging functionalities available to be implemented by the first application 565 includes sending promotional material, for the purchase of the first application 565, to a set of contacts garnered from the list of contacts associated with the second application 500. However, in this same example, the set of messaging functionalities available to be implemented by the second application 500 does not include the promotional material that encourages the sale of the first application 565 to a set of contacts associated with the second application 500. However, in another embodiment, the set of messaging functionalities available to both the first application 565 and the second application 500 for implementation includes the presentation of various views of different content on a display screen (See FIGS. 1 and 2).

At step 1210 of method 1200, in one embodiment and as described herein, based on the receiving at step 1205 of the indication of the first application launching request 535, an authentication token 512 is generated. The authentication token 512 provides an authentication pass to the server 540 when delivered thereto by the first application 565, thereby allowing the first application 565 access to the set of messaging functionalities 545.

At step 1215 of method 1200, in one embodiment and as described herein, the authentication token 512 is sent to the second application 500 for delivery to the first application 565.

At step 1220 of method 1200, in one embodiment and as described herein, the authentication token 512 is received from the first application 565. Further, at step 1220, after receiving the authentication token 512, the set of messaging functionalities 545 is made available for implementation by the first application 565. The set of messaging functionalities 545 are accessed over a communication platform 825 of the first application 565, wherein the communication platform 825 includes the communication functionalities 830 for enabling communication with the second device 500. The first device 1135 and the second device are different, as is discussed herein.

The providing of the set of messaging functionalities 545 at step 1220 includes: enabling a form of communication, via teleconferencing, wherein the form of communication any of, but not limited to being, the following: an audio of the first application 565; a video of the first application 565; selectable views for presenting the first application 565; a presentation of promotional language to the second device, wherein the promotional language promotes a purchase of an application by a user of the second device, wherein the first device 1135 and the second device are different.

With reference now to FIG. 12B, at step 1235 of method 1230, in one embodiment and as described herein, an authentication token 512 is received from the first application 565 located at the first device 1135 and at a server 540 communicatively coupled with the first application 1135. The authentication token 512 is configured for providing an authentication pass to the server 540 when delivered thereto by the first application 565, thereby allowing the first application 565 access to the set of messaging functionalities 545 located at the server 540 and capable of being implemented on the second application 500.

At step 1240 of method 1230, in one embodiment and as described herein, after the receiving the authentication token 512 from the first application 565 of step 1235, a connection is provided between the server 540 and the first application 565, wherein the connection enables the set of messaging functionalities 545 that reside at the server 540 and that are available for implementation by the second application 500 to be available for implementation by the first application 565. The set of messaging functionalities 545 are communicated over a communication platform 825 of the first application 565, wherein the communication platform 825 includes communication functionalities 830 configured for enabling communication with a second device, wherein the first device 1135 and the second device are different.

At step 1245 of method 1230, in one embodiment and as described herein, the steps of 1234 and 1240 further include: receiving, from the second application 500 located at the first device 1135 and at the server 540 communicatively coupled with the second application 500, an indication 535 of a first application launching request; based on the indication 535 of the first application launching request, generating an authentication token 512; and sending the authentication token 512 to the second application 500 for delivery to the first application 565.

At step 1250, in one embodiment and as described herein, the step at 1245 further includes providing access to the set of messaging functionalities 545 for implementation by the first application 565. In various embodiments, the providing access to the set of messaging functionalities 545 includes enabling a form of communication, via teleconferencing, wherein the form of communication may be any of the following: video; audio; a set of selectable views for presenting a portion of the first application 565; and a presentation of promotional language to the second device, wherein the promotional language promotes a purchase of an application by a user of the second device, wherein the first device 1135 and the second device are different.

Thus, embodiments provide methods and systems for generating revenue by promoting third-party application sales and garnering a percentage of such sales. Further, embodiments provide methods and systems for increasing the membership to and installation of communication enabling applications.

Example Computer System Environment

With reference now to FIG. 13, all or portions of some embodiments described herein are composed of computer-readable and computer-executable instructions that reside, for example, in computer-usable/computer-readable storage media of a computer system. That is, FIG. 13 illustrates one example of a type of computer (computer system 1300) that can be used in accordance with or to implement various embodiments which are discussed herein. It is appreciated that computer system 1300 of FIG. 13 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 1300 of FIG. 13 is well adapted to having peripheral non-transitory computer-readable storage media 1302 such as, for example, a floppy disk, a compact disc, digital versatile disc, other disc based storage, universal serial bus "thumb" drive, removable memory card, and the like coupled thereto.

System 1300 of FIG. 13 includes an address/data bus 1304 for communicating information, and a processor 1306A coupled with bus 1304 for processing information and instructions. As depicted in FIG. 13, system 1300 is also well suited to a multi-processor environment in which a plurality of processors 1306A, 1306B, and 1306C are present. Conversely, system 1300 is also well suited to having a single processor such as, for example, processor 1306A. Processors 1306A, 1306B, and 1306C may be any of various types of microprocessors. System 1300 also includes data storage features such as a computer usable volatile memory 1308, e.g., random access memory (RAM), coupled with bus 1304 for storing information and instructions for processors 1306A, 1306B, and 1306C.

System 1300 also includes computer usable non-volatile memory 1310, e.g., read only memory (ROM), coupled with bus 1304 for storing static information and instructions for processors 1306A, 1306B, and 1306C. Also present in system 1300 is a data storage unit 1312 (e.g., a magnetic or optical disk and disk drive) coupled with bus 1304 for storing information and instructions. System 1300 also includes an optional alphanumeric input device 1314 including alphanumeric and function keys coupled with bus 1304 for communicating information and command selections to processor 1306A or processors 1306A, 1306B, and 1306C. System 1300 also includes an optional cursor control device 1316 coupled with bus 1304 for communicating user input information and command selections to processor 1306A or processors 1306A, 1306B, and 1306C. In one embodiment, system 1300 also includes an optional display device 1318 coupled with bus 1304 for displaying information.

Referring still to FIG. 13, optional display device 1318 of FIG. 13 may be a liquid crystal device, cathode ray tube, plasma display device or other display device suitable for creating graphic images and alphanumeric characters recognizable to a user. Optional cursor control device 1316 allows the computer user to dynamically signal the movement of a visible symbol (cursor) on a display screen of display device 1318 and indicate user selections of selectable items displayed on display device 1318. Many implementations of cursor control device 1316 are known in the art including a trackball, mouse, touch pad, joystick or special keys on alphanumeric input device 1314 capable of signaling movement of a given direction or manner of displacement. Alternatively, it will be appreciated that a cursor can be directed and/or activated via input from alphanumeric input device 1314 using special keys and key sequence commands. System 1300 is also well suited to having a cursor directed by other means such as, for example, voice commands. System 1300 also includes an I/O device 1320 for coupling system 1300 with external entities. For example, in one embodiment, I/O device 1320 is a modem for enabling wired or wireless communications between system 1300 and an external network such as, but not limited to, the Internet.

Referring still to FIG. 13, various other components are depicted for system 1300. Specifically, when present, an operating system 1322, applications 1324, modules 1326, and data 1328 are shown as typically residing in one or some combination of computer usable volatile memory 1308 (e.g., RAM), computer usable non-volatile memory 1310 (e.g., ROM), and data storage unit 1312. In some embodiments, all or portions of various embodiments described herein are stored, for example, as an application 1324 and/or module 1326 in memory locations within RAM 1308, computer-readable storage media within data storage unit 1312, peripheral computer-readable storage media 1302, and/or other tangible computer-readable storage media

What I claim is:

1. A messaging functionality distributor configured for generating revenue by growing sales of third-party applications, said messaging functionality distributor comprising:
    a first application launching indication request receiver coupled to a server, said first application launching indication request receiver configured for receiving, from a second application located at a first device, an indication of a first application launching request, wherein said server comprises a set of messaging functionalities that are available for implementation by said second application and are made available for implementation by said first application upon delivery of an authentication token by said first application to said server;
    an authentication generator coupled with said server, said authentication generator configured for, based on said indication of said first application launching request, generating an authentication token, wherein said authentication token is configured for providing an authentication pass to said server when delivered thereto by said first application, thereby allowing said first application access to said set of messaging functionalities;
    an authentication token sender coupled with said server, said authentication token sender configured for sending said authentication token to said second application for delivery to said first application;
    an authentication token receiver coupled with said server, said authentication token receiver configured for receiving said authentication token from said first application; and
    a messaging functionality provider coupled with said server, said messaging functionality provider configured for, after said receiving, providing access to said set of messaging functionalities for implementation by said first application, wherein said set of messaging functionalities are communicated over a communication platform of said first application, wherein said communication platform comprises communication functionalities configured for enabling communication with a second device, wherein said first device and said second device are different.

2. The messaging functionality distributor of claim 1, wherein said set of messaging functionalities comprises:
    communication in video form.

3. The messaging functionality distributor of claim 1, wherein said set of messaging functionalities comprises:
    communication in audio form.

4. The messaging functionality distributor of claim 1, wherein said set of messaging functionalities comprises:
    a presentation of a portion of said first application in a selected view.

5. The messaging functionality distributor of claim 1, wherein said set of messaging functionalities comprises:
    a presentation of promotional language to said second device, wherein said promotional language promotes a purchase of an application by a user of said second device.

6. The messaging functionality distributor of claim 5, wherein said application is said first application.

7. The messaging functionality distributor of claim 5, wherein said application is similar to that of said first application.

* * * * *